(12) United States Patent
Noda

(10) Patent No.: US 12,736,782 B2
(45) Date of Patent: Sep. 15, 2026

(54) IMAGING LENS COMPRISING SEVEN TO NINE LENSES HAVING INDEPENDENT RESIN LENS SETS AND IMAGING DEVICE

(71) Applicant: Tamron Co., Ltd., Saitama (JP)

(72) Inventor: Takayuki Noda, Saitama (JP)

(73) Assignee: TAMRON CO., LTD., Saitama (JP)

( * ) Notice: Subject to any disclaimer, the term of this patent is extended or adjusted under 35 U.S.C. 154(b) by 224 days.

(21) Appl. No.: 18/823,769

(22) Filed: Sep. 4, 2024

(65) Prior Publication Data

US 2025/0110315 A1 Apr. 3, 2025

(30) Foreign Application Priority Data

Sep. 28, 2023 (JP) ................................ 2023-168461

(51) Int. Cl.

| | |
|---|---|
| ***G02B 13/00*** | (2006.01) |
| ***G02B 1/04*** | (2006.01) |
| ***G02B 5/00*** | (2006.01) |
| ***G02B 9/64*** | (2006.01) |

(52) U.S. Cl.

CPC ......... *G02B 13/0045* (2013.01); *G02B 1/041* (2013.01); *G02B 5/005* (2013.01); *G02B 9/64* (2013.01)

(58) Field of Classification Search

None

See application file for complete search history.

(56) References Cited

U.S. PATENT DOCUMENTS

2007/0188885 A1* 8/2007 Kawakami ..... G02B 15/143503 359/680
2010/0208358 A1* 8/2010 Minefuji ................ G02B 13/16 359/682
2010/0295985 A1* 11/2010 Matsusaka ..... G02B 15/144505 359/686
2017/0199355 A1* 7/2017 Kitahara ............ G02B 13/0045
2019/0187442 A1* 6/2019 Jia ............................ G02B 9/64
2020/0264413 A1* 8/2020 Yamanaka ......... G02B 15/1461

FOREIGN PATENT DOCUMENTS

CN 113204099 A 8/2021
CN 116149031 A 5/2023
JP 2017-102211 A 6/2017
JP 2017-125887 A 7/2017
JP 2018-523150 A 8/2018
JP 2022-110784 A 7/2022

* cited by examiner

*Primary Examiner* — Paul C Lee
(74) *Attorney, Agent, or Firm* — Paratus Law Group, PLLC

(57) ABSTRACT

To provide a single focal length lens which has excellent optical characteristics and is advantageous in terms of compactness and cost reduction. The imaging lens has seven to nine lenses including, in order from the object side, a first lens having negative refractive power, a second lens having negative refractive power, a third lens having positive refractive power, and a final lens arranged closest to the image surface side and having negative refractive power, and a diaphragm, and has specific optical characteristics expressed by specific expressions.

13 Claims, 13 Drawing Sheets

940.00 nm
656.27 nm
587.56 nm
486.13 nm
DISTORTION ABERRATION
ANGLE(deg)
94.50
70.88
47.25
23.63
-150.0
-75.0
0.0
75.0
150.0
% DISTORTION
ASTIGMATISM
ANGLE(deg)
T S
94.50
70.88
47.25
23.63
-1.000
-0.500
0.0
0.500
1.000
FOCUS (MILLIMETERS)
SPHERICAL ABERRATION
1.00
0.75
0.50
0.25
-1.000
-0.500
0.0
0.500
1.000
FOCUS (MILLIMETERS)

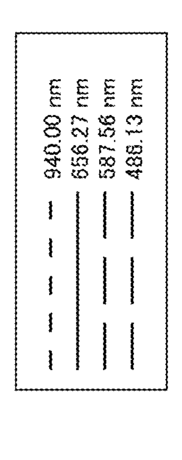
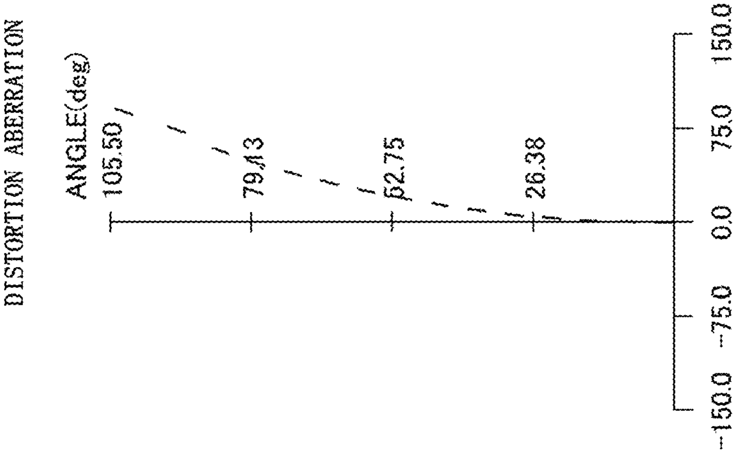
FIG. 8
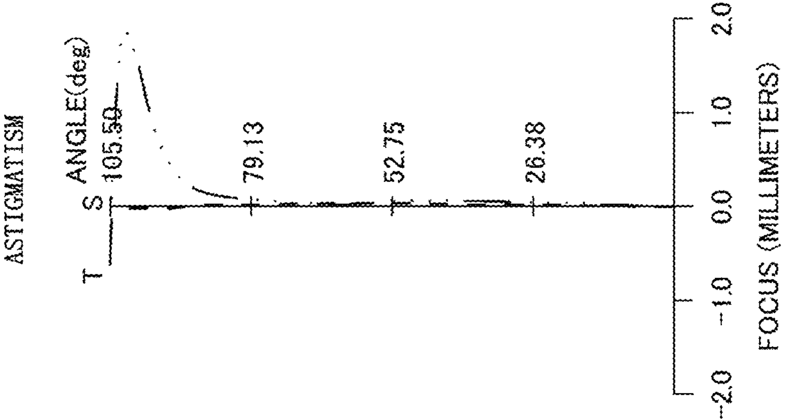
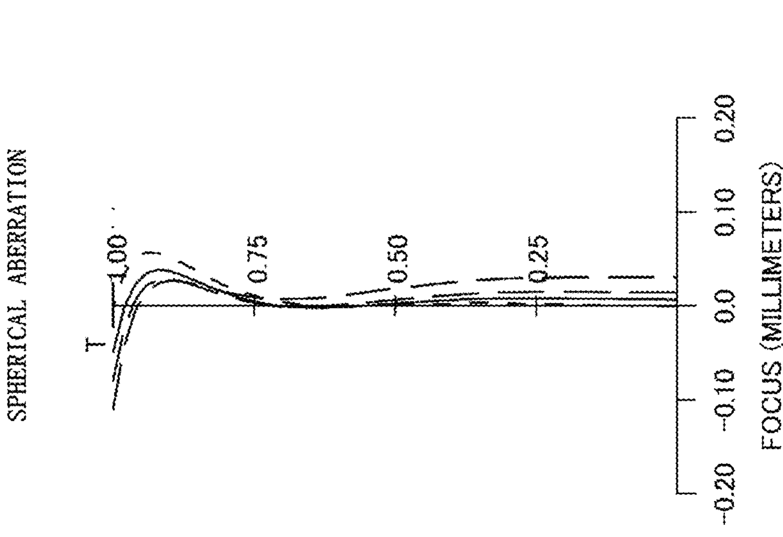

IMAGING LENS COMPRISING SEVEN TO NINE LENSES HAVING INDEPENDENT RESIN LENS SETS AND IMAGING DEVICE

CROSS-REFERENCE TO RELATED APPLICATIONS

This application is based on and claims the benefit of priority from Japanese Patent Application No. 2023-168461, filed on Sep. 28, 2023, the entire contents of which are incorporated herein by reference.

BACKGROUND OF THE INVENTION

Technical Field

The present invention relates to an imaging lens and an imaging device.

Related Art

In recent years, lens imaging devices have been developed for use in, for example, imaging optical systems for automotive lenses, single focal length lenses for surveillance or FA, and for digital input/output devices such as passenger monitoring. Under these circumstances, single focal length lenses having various configurations have been studied. For example, from the viewpoint of reducing costs, a single focal length lens including resin lenses has been studied. As such a single focal length lens, a single focal length lens having seven lenses including a resin lens is known (see, for example, JP 2017-102211 A, JP 2022-110784 A, CN 113204099 A, CN 116149031 A, JP 2017-125887 A, and JP 2018-523150 A).

However, in addition to the optical characteristics, various conditions are required for a single focal length lens depending on its application. The above-mentioned conventional single focal length lens has room for further study in order to realize excellent temperature compensation, reduce costs, and achieve compactness.

An object of one aspect of the present invention is to provide a single focal length lens and an imaging device that have excellent optical characteristics and are advantageous in terms of compactness and cost reduction.

SUMMARY OF THE INVENTION

In order to solve the above problem, an imaging lens according to one aspect of the present invention includes:

- seven to nine lenses inclusive having, in order from an object side, a first lens having negative refractive power, a second lens having negative refractive power, a third lens having positive refractive power, and a final lens that is arranged closest to an image surface side and has negative refractive power; and
- a diaphragm, wherein
- the imaging lens has resin lens sets that are independent in an object side from the diaphragm, and in an image side from the diaphragm, respectively,
- each of the resin lens sets includes a resin lens having positive refractive power and a resin lens having negative refractive power that are adjacent to each other,
- one resin lens included in each of the resin lens sets has a refractive index at line d that is smaller than 1.68 and an Abbe constant that is greater than 20 and less than 30, and following expressions are satisfied:

$$-0.50 < f \times \Phi 2pf < 0.42 \quad (1)$$

$$0.0 < f \times \Phi 2pb < 0.7 \quad (2)$$

here,

- f is a focal length of an optical system of the imaging lens,
- Φ2pf is a reciprocal of a composite focal length of two of the resin lenses of a resin lens set in an object side from the diaphragm, and
- Φ2pb is a reciprocal of a composite focal length of two of the resin lenses of a resin lens set in an image surface side from the diaphragm.

In order to solve the above-mentioned problems, an imaging device according to one aspect of the present invention includes the imaging lens and an image sensor on the image surface side of the imaging lens that converts an optical image formed by the imaging lens into an electrical signal.

Effects of the Invention

According to one aspect of the present invention, it is possible to provide a single focal length lens and an imaging device that have excellent optical characteristics and are advantageous in terms of compactness and cost reduction.

BRIEF DESCRIPTION OF THE DRAWINGS

FIG. 8 illustrates spherical aberration diagrams, astigmatism diagrams, and distortion aberration diagrams of the imaging lens according to Example 4;

Figure 1:
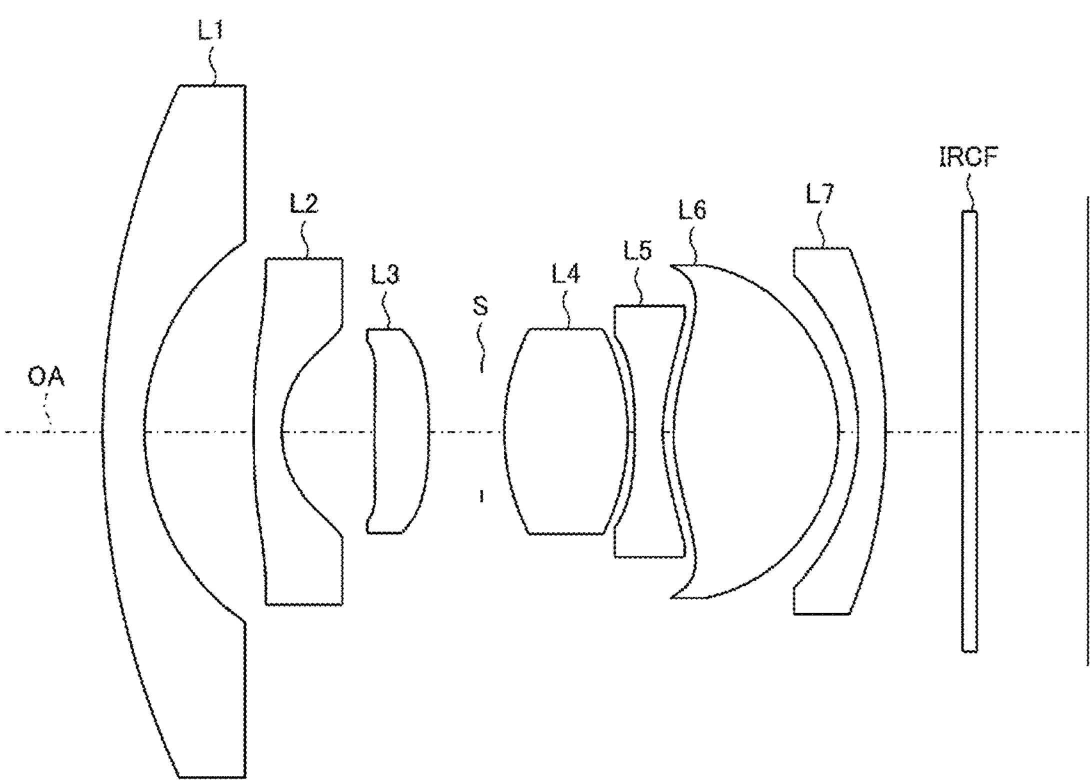
FIG. 1 is a diagram schematically illustrating an optical configuration of an imaging lens according to Example 1 during focusing at 700 mm.

The distortion diagram represents the distortion value targeting the equidistance projection because the object distance is finite and the object surface has curved surface contain the same value of radius as the object distance. Note that it is different from the aberration value in the perspective projection.

DESCRIPTION OF THE EMBODIMENTS

Hereinafter, embodiments of an imaging lens and an imaging device according to the present invention will be described. More specifically, the present embodiment relates to an imaging lens and an imaging device suitable for an imaging device using a solid-state image sensor (CCD, CMOS, etc.), such as a digital still camera or a digital video camera. Here, the imaging lens and imaging device described below are one aspect of the imaging lens and imaging device according to the present invention, and the imaging lens and imaging device according to the present invention are not limited to the following aspect.

1. Imaging Lens 1-1. Optical Configuration

The optical configuration of an imaging lens according to one embodiment of the present invention is described. The imaging lens of the present embodiment has seven to nine lenses including, in order from the object side, a first lens having negative refractive power, a second lens having negative refractive power, a third lens having positive refractive power, and a final lens arranged closest to the image surface side and having negative refractive power, and a diaphragm. The imaging lens has independent resin lens sets in the object side from the diaphragm, and in the image side from the diaphragm, respectively. It is preferable that the imaging lens has a resin lens set from the viewpoint of cost reduction due to the inclusion of a resin lens.

The imaging lens according to the present embodiment includes seven or greater lenses. This configuration is preferable from the viewpoint of further improving the optical characteristics of the imaging lens. On the other hand, pieces of lenses included in the imaging lens are nine or less, and may be eight or less. This configuration is preferable from the viewpoint of reducing the number of constituent lenses and reducing costs and reducing variations during assembly.

(1) Resin Lens Set

The resin lens set includes a resin lens having positive refractive power and a resin lens having negative refractive power that are adjacent to each other. This configuration is preferable from the viewpoint of achieving excellent optical characteristics. For example, this configuration is preferable from the viewpoint of temperature compensation. In the present description, “temperature compensation” refers to correction for suppressing fluctuations in resolution due to temperature, for example, correction for keeping the resolution constant at temperatures from −40° C. to 120° C. inclusive.

The resin lens set includes only both a resin lens having substantially positive refractive power and a resin lens having substantially negative refractive power, and does not include any other lenses, but may include an optical element having no substantial refractive power. The resin lens set in the object side from the diaphragm includes, in order from an object side, for example, a lens having positive refractive power and a lens having negative refractive power. In addition, the resin lens set in the image surface side from the diaphragm includes, in order from an object side, for example, a lens having negative refractive power and a lens having positive refractive power. The resin lens sets may be arranged independently, in the object side from the diaphragm, and in the image side from the diaphragm, respectively, and there are no particular limitations on the position of the imaging lens where each resin lens set is arranged.

One resin lens included in the resin lens set has a refractive index at line d that is smaller than 1.68, and has an Abbe constant that is greater than 20 and less than 30. This configuration is preferable from the viewpoints that it has a large dispersion and satisfies both chromatic aberration correction and temperature compensation at the same time.

It is preferable that two resin lenses of the resin lens set are not cemented together. This configuration is preferable from the viewpoint of improving the desired optical characteristics, particularly various aberrations since the surface shapes of the two non-cemented surfaces are more likely to exhibit their effects, and from the viewpoint of preventing peeling of the bonding material in a case where two resin lenses are cemented together.

In the present description, the “optical system of the imaging lens” refers to an optical system including optical elements from the lens closest to the object side to the lens closest to the image surface side. The optical system of the imaging lens may or may not include additional optical elements outside the aforementioned scope, such as an image sensor cover glass or an infrared cut filter that blocks certain wavelengths of light.

Hereinafter, in an imaging lens, a set of lenses in the object side from the diaphragm is referred to as a first lens group, and a set of lenses in the image surface side from the diaphragm is referred to as a second lens group. The imaging lens does not include any lens group other than the lens group included in the first lens group or the second lens group, and may include an optical element that does not have substantial refractive power.

(2) First Lens Group

The first lens group preferably has at least three lenses. That is, the first lens group may have, in order from the object side, at least a first lens, a second lens, and a third lens.

The first lens has negative refractive power. It is preferable that, in this configuration, the first lens has negative refractive power from the viewpoints of achieving a wide angle and reducing the diameter of the front lens. In the present description, “wide angle” refers to a lens with a horizontal angle of view of approximately 1200 or greater. Moreover, the “front lens” refers to a lens of the imaging lenses that is arranged closest to the object side.

The shape of the first lens is not particularly limited, and can be appropriately changed to obtain desired optical characteristics. It is preferable that the first lens has a concave surface on the image surface side. This configuration is preferable from the viewpoint of appropriately correcting the field curvature and any aberration of the image surface, both of which accompany a wide angle.

The second lens has negative refractive power. That is, in this imaging lens, both the first lens and the second lens have negative refractive power. This configuration is preferable from the viewpoint of widening the angle of the imaging lens, since it is possible to appropriately maintain distortion and field curvature.

It is preferable that the second lens has a meniscus shape and has a concave surface on the image surface side. This configuration is preferable from the viewpoint of appropriately correcting the field curvature and any aberration of the image surface, both of which accompany a wide angle.

The third lens has a positive refractive power. This configuration makes it possible to correct coma aberration that occurs in the first lens and the second lens, and is therefore preferable from the viewpoint of appropriately correcting chromatic aberration and distortion aberration.

The third lens preferably has a convex surface on the image surface side. This configuration is preferable from the viewpoint of appropriately correcting coma aberration that occurs in the first lens and the second lens.

It is preferable that the lenses in the first lens group are not cemented together. In other words, it is preferable that all of the lenses included in the first lens group are independent lenses. The first lens group is a particularly important component in realizing a wide angle and suppressing distortion aberration and lateral chromatic aberration. For this reason, by not cementing the lenses included in the first lens group together, it is easier to exert the effect of various aberration corrections due to the surface shape of each lens, and design freedom is also improved. Therefore, from the viewpoint of optimizing the optical system to achieve desired optical characteristics, it is preferable that the lenses in the first lens group are not cemented together. This configuration is also preferable from the viewpoint of preventing the bonding adhesive from peeling off when the temperature changes.

It is preferable that the first lens group includes two resin lenses. That is, it is preferable that the first lens group includes glass lenses other than the resin lens set. This configuration is preferable from the viewpoint of suppressing the influence of yellowing caused by the resin lenses, since the total thickness of the resin lenses does not become too thick. Furthermore, this configuration is preferable from the viewpoint of temperature compensation for the first lens group.

(3) Second Lens Group

The second lens group includes a final lens. By providing an imaging lens with the second lens group, astigmatism that occurs in the first lens group can be corrected, and therefore this configuration is advantageous for achieving a wide angle.

The final lens has negative refractive power. This configuration is preferable from the viewpoint of improving distortion aberration correction. Furthermore, it is preferable that, in the optical system of the imaging lens, all lenses before the final lens are arranged to have positive refractive power, and the optical system as a whole has a positive-negative telephoto configuration. This configuration is preferable from the viewpoint of shortening the optical system of the imaging lens.

It is preferable that the final lens has a convex surface facing the image surface side. This configuration is preferable from the viewpoint of appropriately correcting the field curvature and any aberration of the image surface. It is more preferable that the final lens has a meniscus shape and has a convex surface on the image surface side. This configuration is preferable from the viewpoint of appropriately correcting distortion and field curvature, and from the viewpoint of shortening the total length of the optical system.

The second lens group preferably has at least two lenses having positive refractive power. This configuration is preferable from the viewpoint of appropriately correcting the field curvature.

It is preferable that the lens in the second lens group closest to the object side be a lens having positive refractive power. Hereinafter, this lens may be referred to as lens L21. This configuration is advantageous for achieving high resolution at peripheral image heights and achieving a wide angle for the imaging lens, since the distortion aberration and astigmatism that occur in the first lens group can be appropriately corrected by the second lens group.

The surface of the lens L21 on the object side is preferably a convex surface with a curvature radius r divided by the focal length f of the optical system of the imaging lens, r/f, of 15 or less, and more preferably r/f of 10 or less. It is preferable that the surface of the lens of the second lens group on the object side has a larger curvature, since this is more advantageous for achieving high resolution at peripheral image heights and achieving a wide angle for the imaging lens.

Preferably, both surfaces of lens L21 are convex. In a case where the lens has a strong power by making both surfaces of the lens convex, it is possible to divide the power between the surface on the object side and the surface on the image surface side, so that aberration correction can be divided between two surfaces. Since the division of the aberration correction makes it possible to alleviate the abrupt refraction of light rays, this configuration is preferable from the viewpoint of suppressing the occurrence of high-order aberrations.

The lens L21 is preferably a low-dispersion glass lens from the viewpoint of suitably correcting chromatic aberration in the lens L21. The lens L21 has a large difference in the incidence angle characteristics between off-axis light rays and on-axis light rays, and therefore has a higher effect of correcting off-axis chromatic aberration than on-axis chromatic aberration. In particular, the Abbe constant at line d is preferably greater than 45, and even more preferably greater than 48. From the viewpoint of appropriately correcting chromatic aberration, it is preferable that the Abbe constant at line d is not below the lower limit, and the greater the Abbe constant, the greater this effect becomes.

Of the two lenses having positive refractive power that the second lens group may include, the shape, material, etc. of the lens Lp2 other than L21 are not particularly limited and can be changed as appropriate from the viewpoint of achieving desired optical characteristics.

In the second lens group, a lens having negative refractive power may be arranged on the object side of each of the lenses having positive refractive power except for L21, or a lens having negative refractive power may be arranged on the object side of at least one of the lenses having positive refractive power other than L21. This configuration makes it easier to arrange the incident pupil position of the second lens group in the object side, and is therefore preferable from the viewpoint of radial compactness and appropriate correction of on-axis and near-axis chromatic aberration.

It is preferable that the second lens group has, in addition to the final lens, at least one lens having negative refractive power. This configuration is preferable from the viewpoint of appropriately correcting chromatic aberration.

The lens having negative refractive power included in the second lens group preferably has a refractive index at line d of more than 1.65, and more preferably more than 1.75. It is preferable, from the viewpoint of compactness of the imaging lens, that the refractive index is not below the lower limit.

It is preferable, in the second lens group, to arrange a lens having positive refractive power on the object side of the lens having negative refractive power. This configuration is preferable from the viewpoint of appropriately correcting on-axis and near-axis chromatic aberration. In particular, it is preferable, from the viewpoint of obtaining this effect, to arrange a lens having positive refractive power on the object side of the final lens.

It is preferable that the second lens group has positive refractive power as a whole. This configuration is preferable from the viewpoint of correcting astigmatism that occurs in the first lens group. Moreover, this configuration is preferable from the viewpoint of realizing a bright imaging lens.

It is preferable that the lenses in the second lens group are not cemented together. In other words, it is preferable that all of the lenses included in the second lens group are independent lenses. By not cementing the lenses included in the second lens group together, it is easier to exert the effect due to the surface shape of each lens, and design freedom is also improved, and this configuration is therefore preferable from the viewpoint of optimizing the optical system to achieve desired optical characteristics. It is also preferable from the viewpoint of preventing the bonding adhesive from peeling off when the temperature changes.

It is preferable that the second lens group include two resin lenses. That is, it is preferable that the second lens group includes glass lenses other than the resin lens set. This configuration is preferable from the viewpoint of suppressing the influence of yellowing of the resin, since the total thickness of the resin lens does not become too thick. Furthermore, this configuration is preferable from the viewpoint of temperature compensation for each of the first lens group and the second lens group.

(3) Diaphragm

The diaphragm is located in the image surface side from the third lens and in the object side from the final lens. The diaphragm defines the F-number of the imaging lens. In the present description, the "diaphragm" is also called an "aperture diaphragm".

It is preferable that lenses having positive refractive power are arranged on both the object side and the image surface side of the diaphragm. This configuration is preferable from the viewpoint of reducing the effective diameters of both lenses that sandwich the diaphragm. Moreover, it is possible to make both the surface of the positive lens on the object side and the surface of the positive lens on the image surface side smaller than the surface of the diaphragm. This is advantageous in suppressing the action of aberration correction with each other of adjacent lenses.

(4) Others

The imaging lens preferably has a chief ray angle (Cra) in the range of 250 or less. Here, the chief ray angle is the angle of the chief ray entering the image surface from the imaging lens. This configuration is preferable from the viewpoint of achieving both compactness of the imaging lens and high sensitivity in the image sensor.

1-2. Expressions

It is desirable for the imaging lens to employ the above-mentioned configuration and to satisfy at least one of the following expressions.

1-2-1. Expression (1)

$$-0.50 < f \times \Phi 2pf < 0.42 \quad (1)$$

f is a focal length of the optical system of the imaging lens, and

Φ2pf is a reciprocal of a composite focal length of two resin lenses of a resin lens set in an object side from the diaphragm.

Expression (1) is an expression for appropriately defining the ratio between the focal length of the optical system of the imaging lens and the composite focal length of the two resin lenses of the resin lens set in the object side from the diaphragm. Here, Φ2pf represents the composite power of the resin lens set in the object side from the diaphragm. Satisfying the expression (1) is preferable from the viewpoint of shortening the focal length of the optical system of the imaging lens and from the viewpoint of suppressing fluctuations in the chief ray and fluctuations in the angle of view due to temperature.

From the viewpoint of shortening the focal length of the optical system of the imaging lens and suppressing changes in the focal position due to temperature changes with respect to the physical image surface (surface of the image sensor), f×Φ2pf is preferably equal to or greater than −0.35, more preferably equal to or greater than −0.32, and even more preferably equal to or greater than −0.28. From the viewpoint of shortening the focal length of the optical system of the imaging lens and suppressing fluctuations in the chief ray and fluctuations in the angle of view due to temperature, f×Φ2pf is preferably equal to or less than 0.40, and more preferably equal to or less than 0.20. The closer f×Φ2pf is to 0, the more preferable it is.

1-2-2. Expression (2)

$$0.0 < f \times \Phi 2pb < 0.7 \quad (2)$$

f is a focal length of the optical system of the imaging lens, and

Φ2pb is a reciprocal of a composite focal length of two resin lenses of a resin lens set in an image surface side from the diaphragm.

Expression (2) is an expression for appropriately defining the ratio between the focal length of the optical system of the imaging lens and the composite focal length of the two resin lenses of the resin lens set in the image surface side from the diaphragm. Here, Φ2pb represents the composite power of the resin lens set in the image surface side from the diaphragm. Satisfying the expression (2) is preferable from the viewpoint of shortening the focal length of the optical system of the imaging lens, thereby reducing changes in the focal position due to the temperature changes with respect to the sensor surface. Here, the sensor surface refers to a physical image surface (for example, the surface of an image sensor).

From the viewpoint of shortening the focal length of the imaging lens of the imaging lens optical system and suppressing changes in the focus position due to temperature changes with respect to the physical image surface (surface of the image sensor), f×Φ2pb is preferably 0.03 or greater, and more preferably 0.04 or greater. From the viewpoint of shortening the focal length of the optical system of the imaging lens and suppressing fluctuations in the chief ray and fluctuations in the angle of view due to temperature, f×Φ2pb is preferably 0.6 or less, more preferably 0.55 or less, and even more preferably 0.47 or less.

1-2-3. Expression (3)

$$-2.3 < f2/f < 0.0 \quad (3)$$

f is a focal length of the optical system of the imaging lens, and f2 is a focal length of the second lens.

Expression (3) is an expression for appropriately defining the ratio between the focal length of the optical system of the imaging lens and the focal length of the second lens. Satisfying the expression (3) is preferable from the viewpoints of appropriately keeping distortion and field curvature, achieving a wide angle, and improving and maintaining the resolution performance.

From the viewpoint of shortening the focal length of the optical system of the imaging lens, maintaining a wide angle, and improving and maintaining the resolution performance, f2/f is preferably −2.0 or greater, and more preferably −1.9 or greater. Furthermore, from the viewpoint of appropriately keeping distortion and field curvature, f2/f is preferably −0.80 or less, and more preferably −0.50 or less.

1-2-4. Expression (4)

$$-20.00 < fL/f < -1.61 \quad (4)$$

f is a focal length of the optical system of the imaging lens, and fL is a focal length of the final lens.

Expression (4) is an expression for appropriately defining the ratio between the focal length of the optical system of the imaging lens and the focal length of the final lens. Satisfying the expression (4) is preferable from the viewpoint of shortening the total optical length, since the final lens has negative refractive power and the optical system has a positive-negative telephoto configuration.

From the viewpoint of shortening the total optical length, fL/f is preferably −15.00 or greater, more preferably −12.50 or greater, and even more preferably −8.00 or greater. From the viewpoint of shortening the focal length of the optical system of the imaging lens, maintaining a wide angle, and improving and maintaining the resolution performance, fL/f is preferably −1.80 or less, and more preferably −2.20 or less.

1-2-5. Expression (5)

$$0.0 < Dp/f < 1.3 \quad (5)$$

Dp is a total thickness of resin lenses in the object side from the diaphragm, and f is a focal length of the optical system of the imaging lens.

Expression (5) is an expression for appropriately defining the ratio between the total thickness of the resin lens in the object side from the diaphragm and the focal length of the optical system of the imaging lens. Satisfying the expression (5) is preferable from the viewpoint of suppressing a decrease in transmittance due to yellowing of the resin, since the total thickness of the resin is thin.

From the viewpoint of realizing desired optical characteristics with the resin lens, Dp/f is preferably 0.2 or greater, more preferably 0.4 or greater, and even more preferably 0.6 or greater. Furthermore, from the viewpoint of suppressing a decrease in transmittance due to yellowing of the resin lens, Dp/f is preferably 1.2 or less, more preferably 1.0 or less, and even more preferably 0.85 or less.

1-2-6. Expression (6)

$$0.00 < Dp2/f < 1.00 \quad (6)$$

Dp2 is a sum of the center thicknesses of the resin lenses in the object side from the diaphragm, other than the resin lens having negative refractive power included in the resin lens set, and f is a focal length of the optical system of the imaging lens.

Expression (6) is an expression for appropriately defining the ratio between the sum of the center thicknesses of the resin lenses in the object side from the diaphragm, other than the resin lens having negative refractive power included in the above-mentioned resin lens set, and the focal length of the optical system of the imaging lens. Satisfy the expression (6) is preferable from the viewpoint of suppressing a decrease in transmittance due to yellowing of the resin lens.

Of a pair of adjacent resin lenses in a resin lens set, the resin lens with smaller dispersion tends to yellow more easily than the other resin lens. From the viewpoint of realizing desired optical characteristics with the resin lens, Dp2/f is preferably 0.31 or greater, and more preferably 0.40 or greater. Furthermore, from the viewpoint of suppressing a decrease in transmittance due to yellowing of the resin lens, Dp2/f is preferably 0.80 or less, and more preferably 0.60 or less.

1-2-7. Expression (7)

$$1.1 < ImgH/f < 2.5 \quad (7)$$

ImgH is a maximum image height, and f is a focal length of the optical system of the imaging lens.

Expression (7) is an expression for appropriately defining the ratio between the maximum image height and the focal length of the optical system of the imaging lens. Satisfying the expression (7) is preferable from the viewpoint of realizing both an appropriate range of distortion and a wide angle, and realizing high resolution.

From the viewpoint of achieving small distortion and a wide angle by shortening the focal length of the optical system of the imaging lens, ImgH/f is preferably 1.25 or greater, and more preferably 1.5 or greater. From the viewpoint of achieving high resolution through a wide angle by increasing distortion, ImgH/f is preferably 2.3 or less, more preferably 2.1 or less, and even more preferably 1.98 or less.

1-2-8. Expression (8)

$$-9.0 < f1/f < -2.5 \quad (8)$$

f is a focal length of the optical system of the imaging lens, and f1 is a focal length of the first lens.

Expression (8) is an expression for appropriately defining the ratio between the focal length of the optical system of the imaging lens and the focal length of the first lens. Satisfying the expression (8) is preferable from the viewpoint of realizing both an appropriate range of distortion and a wide angle, and realizing high resolution.

From the viewpoint of achieving small distortion and a wide angle by shortening the focal length of the optical system of the imaging lens, f1/f is preferably −8.5 or greater, more preferably −8.0 or greater, and even more preferably −7.0 or greater. From the viewpoint of achieving high resolution through a wide angle by increasing distortion, f1/f is preferably −3.0 or less, more preferably −3.4 or less, and even more preferably −3.7 or less.

1-2-9. Expression (9)

$$\text{Four}.0 < TL/f < 9.0 \quad (9)$$

TL is a total length of the optical system of the imaging lens, and f is a focal length of the optical system of the imaging lens.

Expression (9) is an expression for appropriately defining the ratio between the total length of the optical system of the imaging lens and the focal length of the optical system of the imaging lens. The total length of the optical system of the imaging lens refers to the distance, on the optical axis of the optical system of the imaging lens, from the object-side lens surface of the lens closest to the object side to the image surface. Satisfying the expression (9) is preferable from the viewpoint of realizing both an appropriate range of distortion and a wide angle, and realizing high resolution.

From the viewpoints of small distortion, a wide angle, and shortening of the total optical length, TL/f is preferably 5.5 or greater, more preferably 5.7 or greater, and even more preferably 6.2 or greater. From the viewpoint of achieving a wide angle by increasing distortion, TL/f is preferably 7.8 or less, more preferably 7.2 or less, and even more preferably 6.9 or less.

1-2-10. Expression (10)

$$-1.7 < \Sigma(fn/VLn) < -0.3 \quad (10)$$

fn is a focal length of any lens that has negative refractive power among lenses of the imaging lens, and VLn is an Abbe constant of any of the lens having negative refractive power among lenses of the imaging lens.

Expression (10) is an expression for appropriately defining the sum of the ratios of the focal length to the Abbe constant for each lens having negative refractive power among lenses of the imaging lens. Here, the n-th lens refers to the n-th lens from the object side. Satisfying the expression (10) from the viewpoint of appropriately correcting chromatic aberration.

From the viewpoint of appropriately correcting chromatic aberration, Σ(fn/VLn) is preferably −1.5 or greater, more preferably −1.4 or greater, and even more preferably −1.3 or greater. Furthermore, from the viewpoint of balancing chromatic aberration and Petzval sum, Z (fn/VLn) is preferably −0.4 or less, more preferably −0.55 or less, and even more preferably −0.65 or less.

1-2-11. Expression (11)

$$1.40 < (RL1 + RL2)/(RL1 - RL2) < 2.65 \quad (11)$$

RL1 is a paraxial curvature radius of the surface of the first lens on the object side, and RL2 is a paraxial curvature radius of the surface of the first lens on the image surface side.

Expression (11) is an expression for appropriately defining the shaping factor of the first lens. Satisfying the expression (11) is preferable from the viewpoint of realizing a wide angle and higher resolution while reducing the amount of distortion that occurs in the first lens.

From the viewpoint of achieving a wide angle by increasing distortion, (RL1+RL2)/(RL1−RL2) is preferably 1.55 or greater, more preferably 1.70 or greater, and even more preferably 1.80 or greater. Furthermore, from the viewpoint of achieving a wide angle while keeping distortion small, (RL1+RL2)/(RL1−RL2) is preferably 2.45 or less, more preferably 2.35 or less, and even more preferably 2.00 or less.

1-2-12. Expression (12)

$$50 < V1 < 85 \quad (12)$$

V1 is an Abbe constant of the first lens at line d.

Expression (12) is an expression for appropriately defining the Abbe constant of the first lens. Satisfying the expression (12) is preferable from the viewpoint of achieving both a wide angle for the imaging lens and reduction in lateral chromatic aberration.

From the viewpoint of reducing lateral chromatic aberration, V1 is preferably 56 or greater, more preferably 58 or greater, and even more preferably 60 or greater. Furthermore, from the viewpoint of achieving a wide angle for the imaging lens, V1 is preferably 80 or less, more preferably 78 or less, and even more preferably 72 or less.

1-2-13. Expression (13)

$$18 < V3 < 28 \quad (13)$$

V3 is an Abbe constant of the third lens at line d.

Expression (13) is an expression for appropriately defining the Abbe constant of the third lens. Satisfying the expression (13) is preferable from the viewpoint of achieving both correction of coma aberration and reduction in chromatic aberration.

From the viewpoint of reducing chromatic aberration, V3 is preferably 20 or greater, more preferably 22 or greater, and most preferably 24 or greater. Moreover, from the viewpoint of realizing correction of coma aberration correction, V3 is preferably 27 or less, more preferably 26 or less, and further preferably 25.5 or less.

1-2-14. Expression (14)

$$1.48 < N1 < 1.75 \quad (14)$$

N1 is a refractive index of the first lens at line d.

Expression (14) is an expression for appropriately defining the refractive index of the first lens. Satisfying the expression (14) is preferable from the viewpoint of achieving both a wide angle and reduction in chromatic aberration.

From the viewpoint of realizing a wide angle, N1 is preferably 1.49 or greater, more preferably 1.50 or greater, and even more preferably 1.52 or greater. Furthermore, from the viewpoint of reducing lateral chromatic aberration, N1 is preferably 1.72 or less, more preferably 1.69 or less, and even more preferably 1.60 or less.

1-2-15. Expression (15)

$$0.69 < DL/TL < 0.93 \quad (15)$$

DL is a total thickness of the optical system of the imaging lens, and

TL is a total length of the optical system of the imaging lens.

Expression (15) is an expression for appropriately defining the ratio between the total thickness of the optical system of the imaging lens and the total length of the optical system of the imaging lens. The total thickness of an imaging lens optical system refers to the distance from the surface of the first lens on the object side to the surface of the final lens on the image surface side. Satisfying the expression (15) is preferable from the viewpoint of achieving both shortening the total length of the optical system of the imaging lens and appropriately correcting distortion aberration.

From the viewpoint of appropriately correcting distortion aberration caused by arranging the final lens, which is a lens having negative refractive power, close to the image surface side, DL/TL is preferably 0.72 or greater, more preferably 0.73 or greater, and even more preferably 0.75 or greater. From the viewpoint of shortening the total optical length by shortening the back focus, DL/TL is preferably 0.91 or less, more preferably 0.88 or less, and even more preferably 0.85 or less.

1-2-16. Expression (16)

$$0.01 < DpL/f < 0.33 \quad (16)$$

DpL is a distance on the optical axis between the lens that is located closest to the image surface side among lenses having positive refractive power (also called "positive lens") included in the imaging lens and a lens that is located on the object side of the lens, and f is a focal length of the optical system of the imaging lens.

Expression (16) is an expression for appropriately defining the ratio of the distance on the optical axis between the positive lens closest to the image surface side and the adjacent lens closest to the object side, relative to the focal length of the optical system of the imaging lens. Satisfying the expression (16) is preferable from the viewpoint of achieving both shortening the total length of the optical system of the imaging lens and correcting coma aberration.

From the viewpoint of appropriately correcting coma aberration that occurs on the object side of the positive lens, DpL/f is preferably 0.02 or greater, more preferably 0.035 or greater, and even more preferably 0.04 or greater. Furthermore, from the viewpoint of shortening the total length of the optical system of the imaging lens, DpL/f is preferably 0.28 or less, more preferably 0.25 or less, and even more preferably 0.23 or less.

1-2-17. Expression (17)

$$0.4 < Bf/f < 1.7 \quad (17)$$

Bf is a back focus of the optical system of the imaging lens, and f is a focal length of the optical system of the imaging lens.

Expression (17) is an expression for appropriately defining the ratio of the back focus to the focal length of the optical system of the imaging lens. Satisfying the expression (17) is preferable from the viewpoint of achieving both shortening the total length of the optical system of the imaging lens and correcting distortion aberration.

From the viewpoint of achieving appropriate distortion aberration due to arrangement of the final lens close to the image surface side, Bf/f is preferably 0.5 or greater, more preferably 0.55 or greater, and even more preferably 0.65 or greater. From the viewpoint of shortening the total length of the optical system by reducing the back focus of the imaging lens, Bf/f is preferably 1.55 or less, more preferably 1.4 or less, and even more preferably 1.1 or less.

2. Imaging Device

Next, an imaging device according to one embodiment of the present invention is described. The imaging device includes the imaging lens according to the present embodiment described above, and an image sensor provided on the image surface side of the imaging lens for converting an optical image formed by the imaging lens into an electrical signal.

Here, the image sensor is not particularly limited, and a solid-state image sensor such as a charge coupled device (CCD) sensor or a complementary metal oxide semiconductor (CMOS) sensor can also be used. The imaging device may further include optical elements other than lenses, such as a silver halide film, an infrared cut filter (IRCF), and a plane-parallel plate. The imaging device according to the present embodiment is suitable for use as an imaging device using a solid-state image sensor. The imaging device may be a lens fixed type imaging device in which a lens is fixed to a housing, or may be a lens interchangeable type imaging device such as a single lens reflex camera or a mirrorless camera.

Figure 13:
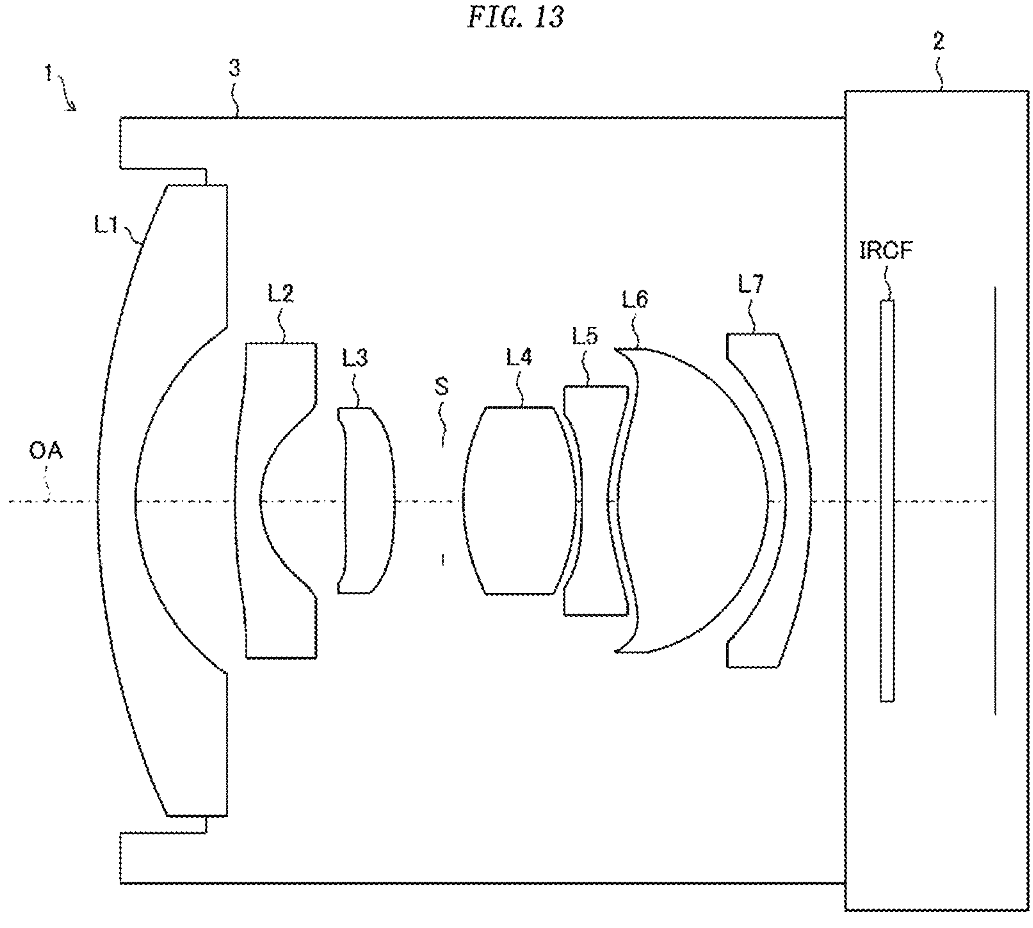
FIG. 13 is a diagram schematically illustrating an example of a configuration of an imaging device according to one embodiment of the present invention.

FIG. 13 is a diagram illustrating an example of the configuration of an imaging device according to the present embodiment. As illustrated in FIG. 13, the mirrorless camera 1 has a body 2 and a lens barrel 3 that is detachable from the body 2. The mirrorless camera 1 is one aspect of the imaging device.

The lens barrel 3 has an imaging lens. The imaging lens includes a first lens L1, a second lens L2, a third lens L3, a diaphragm, a fourth lens L4, a fifth lens L5, a sixth lens L6, and a seventh lens L7. The imaging lens is configured so as to satisfy, for example, the above-mentioned expressions (1) and (2). Moreover, the imaging lens is configured so as to satisfy, for example, the above-mentioned expressions (3) and (4).

The first lens L1 has negative refractive power. The second lens L2 has negative refractive power. The third lens L3 has positive refractive power. The fourth lens L4 has positive refractive power. The fifth lens L5 has negative refractive power. The sixth lens L6 has positive refractive power. The seventh lens L7 has negative refractive power.

The main body 2 has a CCD sensor as an image sensor and an infrared cut filter IRCF. The CCD sensor is arranged in the main body 2 at a position where the optical axis OA of the imaging lens in the lens barrel 3 attached to the main body 2 is the central axis. The main body 2 may have a parallel plane plate having no substantial refractive power, such as a cover glass, instead of the infrared cut filter IRCF22, and in this case, there is still no problem in terms of resolution performance.

In addition to the above-mentioned configuration, the imaging device of the present embodiment preferably has an image processing unit, an image correction data storage unit, and the like. The image processing unit electrically processes the captured image data acquired by the image sensor to change the shape of the captured image. The image correction data storage unit stores image correction data and an image correction program used for processing captured image data in the image processing unit. In general, when a lens is made compact, distortion of the shape of a captured image formed on an image forming surface becomes more likely to occur. The above-described configuration further including an image processing unit and the like makes it possible to appropriately correct the shape and distortion of a captured image using, for example, the distortion correction data stored in the image correction data storage unit. Therefore, the above-described configuration is preferable from the viewpoint of obtaining a beautiful captured image and achieving compactness of the entire imaging device.

Furthermore, it is preferable that the image correction data storage unit has lateral chromatic aberration correction data for correcting lateral chromatic aberration, and that the image processing unit corrects the lateral chromatic aberration in the captured image using the lateral chromatic aberration correction data. Such a configuration that corrects lateral chromatic aberration is also preferable from the viewpoint of obtaining a beautiful captured image and achieving compactness of the entire imaging device.

The present invention is not limited to the above-described embodiments, and various modifications are possible within the scope of the claims. The technical scope of the present invention also includes embodiments obtained by appropriately combining the technical means disclosed respectively in the different embodiments.

SUMMARY

According to a first aspect of the present invention, an imaging lens including:

seven to nine lenses inclusive having, in order from an object side, a first lens having negative refractive power, a second lens having negative refractive power, a third lens having positive refractive power, and a final lens that is arranged closest to an image surface side and has negative refractive power; and a diaphragm, wherein the imaging lens has resin lens sets that are independent in an object side from the diaphragm, and in an image side from the diaphragm, respectively, each of the resin lens sets includes a resin lens having positive refractive power and a resin lens having negative refractive power that are adjacent to each other, one resin lens included in each of the resin lens sets has a refractive index at line d that is smaller than 1.68 and an Abbe constant that is greater than 20 and less than 30, and following expressions are satisfied:

$$-0.50 < f \times \Phi 2pf < 0.42 \quad (1)$$

$$0.0 < f \times \Phi 2pb < 0.7 \quad (2)$$

here, f is a focal length of an optical system of the imaging lens,

Φ2pf is a reciprocal of a composite focal length of two of the resin lenses of a resin lens set in an object side from the diaphragm, and Φ2pb is a reciprocal of a composite focal length of two of the resin lenses of a resin lens set in an image surface side from the diaphragm.

According to a second aspect of the present invention, in the imaging lens in the first aspect, the third lens has a convex surface on the image surface side and the following expression is satisfied:

$$-2.3 < f2/f < 0.0 \quad (3)$$

here, f2 is a focal length of the second lens, and f is a focal length of the optical system of the imaging lens.

According to a third aspect of the present invention, the imaging lens in the first aspect or the second aspect satisfies the following expression:

$$-20.00 < fL/f < -1.61 \quad (4)$$

here, fL is a focal length of the final lens, and f is a focal length of the optical system of the imaging lens.

According to a fourth aspect of the present invention, in the imaging lens in any one of the first aspect to the third aspect, pieces of lenses are eight or less.

According to a fifth aspect of the present invention, in the imaging lens in any one of the first aspect to the fourth aspect, the final lens has a convex surface on the image surface side.

According to a sixth aspect of the present invention, in the imaging lens in any one of the first aspect to the fifth aspect, the first lens has a concave surface on the image surface side.

According to a seventh aspect of the present invention, in the imaging lens in any one of the first aspect to the sixth aspect, the second lens has a meniscus shape and has a concave surface on the image surface side.

According to an eighth aspect of the present invention, the imaging lens in any one of the first aspect to the seventh aspect satisfies the following expression:

$$0.0 < Dp/f < 1.3 \quad (5)$$

here,

Dp is a total thickness of resin lenses in the object side from the diaphragm, and f is a focal length of the optical system of the imaging lens.

According to a ninth aspect of the present invention, the imaging lens in any one of the first aspect to the eighth aspect satisfies the following expression:

$$0.00 < Dp2/f < 1.00 \quad (6)$$

here,

Dp2 is a sum of the center thicknesses of the resin lenses in the object side from the diaphragm, other than the resin lens having negative refractive power included in the resin lens set, and f is a focal length of the optical system of the imaging lens.

According to a tenth aspect of the present invention, the imaging lens in any one of the first aspect to the ninth aspect satisfies the following expression:

$$1.1 < ImgH/f < 2.5 \quad (7)$$

here,

ImgH is a maximum image height, and f: a focal length of the optical system of the imaging lens.

According to an eleventh aspect of the present invention, in the imaging lens in any one of the first aspect to the tenth aspect, two resin lenses of the resin lens set are not cemented together.

According to a twelfth aspect of the present invention, the imaging lens in any one of the first aspect to the eleventh aspect satisfies the following expression:

$$-9.0 < f1/f < -2.5 \quad (8)$$

here, f1 is a focal length of the first lens group, and f is a focal length of the optical system of the imaging lens.

An imaging device according to a thirteenth aspect of the present invention includes an imaging lens according to any one of the first aspect to the twelfth aspect, and an image sensor on the image surface side of the imaging lens that converts an optical image formed by the imaging lens into an electrical signal.

EXAMPLES

One example of the present invention is described. In the following tables, unless otherwise specified, all length units are "mm", all angle of view units are "°", and "E+a" represents "$\times10^{a}$".

Example 1

FIG. 1 is a diagram schematically illustrating an optical configuration of the imaging lens of Example 1 during focusing at 700 mm. The imaging lens of Example 1 includes, in order from the object side, a first lens L1 having negative refractive power, a second lens L2 having negative refractive power, a third lens L3 having positive refractive power, an aperture diaphragm S, a fourth lens L4 having positive refractive power, a fifth lens L5 having negative refractive power, a sixth lens L6 having positive refractive power, and a seventh lens L7 having negative refractive power.

The first lens L1 has a negative meniscus shape and has a convex surface facing the object side. The second lens L2 has a negative meniscus shape and has a convex surface facing the object side. The third lens L3 has a biconvex shape. The fourth lens L4 has a biconvex shape. The fifth lens L5 has a biconcave shape. The sixth lens L6 has a biconvex shape. The seventh lens L7 has a negative meniscus shape and has a convex surface facing the image surface side.

The aperture diaphragm S is arranged on the image surface side of the third lens L3. The first lens L1, the second lens L2, and the third lens L3, which are arranged in the object side from the aperture diaphragm S, constitute the first lens group described above. The fourth lens L4, fifth lens L5, sixth lens L6, and seventh lens L7, which are arranged in the image surface side from the aperture diaphragm S, constitute the second lens group described above. The second lens L2 and the third lens L3 are resin lenses, and the set of these two lenses corresponds to the resin lens set in the object side from the diaphragm described above. The fifth lens L5 and the sixth lens L6 are resin lenses, and the set of these two lenses corresponds to the resin lens set in the image surface side from the diaphragm described above. The seventh lens L7 corresponds to the final lens described above.

"IRCF" is a cover glass with an infrared cut filter function. These points are similar to those in the drawings that schematically illustrate the optical configurations of other examples, and therefore are not described below.

Next, numerical examples to which specific numerical values of the imaging lens are applied are described. Table 1 illustrates the surface data of the imaging lens.

In the surface data table in the examples of the present invention, "No." represents the order of the lens surface counted from the object side, "r" represents the curvature radius of the lens surface, "d" represents the interval between the lens surfaces on the optical axis, "Nd" represents the refractive index with respect to line d (wavelength λ=587.6 nm), "vd" represents the Abbe constant with respect to line d, and the "*" displayed in the "ASP" column next to the surface number represents that the lens surface is aspheric. The "S" in the "No." column represents the aperture diaphragm. The first surface number in the table, "–", represents the object surface. Also, the curvature radius r "0" means that the surface is a plane. In Table 1, No. 1 and 2 are surface numbers of the first lens L1. No. 3 and 4 are surface numbers of the second lens L2. No. 5 and 6 are surface numbers of the third lens L3. No. 7 is the surface number of the aperture diaphragm. No. 8 and 9 are surface numbers of the fourth lens L4. No. 10 and 11 are surface numbers of the fifth lens L5. No. 12 and 13 are surface numbers of the sixth lens L6. No. 14 and 15 are surface numbers of the seventh lens L7. No. 16 and No. 17 are surface numbers of the cover glass.

TABLE 1

| No. | ASP | r | d | Nd | vd |
|---|---|---|---|---|---|
| — | | 700 | 700 | | |
| 1 | | 11.870 | 0.600 | 1.6200 | 63.88 |
| 2 | | 3.326 | 1.577 | | |
| 3 | * | 21.184 | 0.400 | 1.5447 | 55.86 |
| 4 | * | 1.614 | 1.338 | | |
| 5 | * | 15.260 | 0.788 | 1.6393 | 23.35 |
| 6 | * | −6.447 | 0.758 | | |
| 7S | | 0.000 | 0.325 | | |
| 8 | | 3.230 | 1.782 | 1.5503 | 75.50 |
| 9 | | −3.230 | 0.100 | | |
| 10 | * | −10.765 | 0.406 | 1.6393 | 23.35 |
| 11 | * | 2.409 | 0.154 | | |
| 12 | * | 2.720 | 2.376 | 1.5447 | 55.86 |
| 13 | * | −2.442 | 0.280 | | |
| 14 | | −3.224 | 0.400 | 1.7552 | 27.53 |
| 15 | | −6.911 | 1.111 | | |
| 16 | | 0.000 | 0.200 | 1.51680 | 64.20 |
| 17 | | | 1.605 | | |

Table 2 illustrates the specifications of the imaging lens of Example 1. In the specification table, "f" represents the focal length of the imaging lens, "Fno" represents the F-number, and "Cra" represents the chief ray angle. Here, the chief ray angle is the angle of the chief ray entering the image surface side.

TABLE 2

| | |
|---|---|
| Pieces of lenses | 7 |
| f | 2.183 |
| Fno | 2.200 |
| Cra | 20.0 |

Table 3 illustrates the aspheric coefficients of the aspheric surface in the imaging lens of Example 1. The aspheric coefficients in the table are values when each aspheric shape is defined by the following expression (I).

[Formula 1]

$$X(Y) = \frac{CY^2}{1+\sqrt{1-(1+k)CY^2}} + A_4Y^4 + A_6Y^6 + A_8Y^8 + A_{10}Y^{10} + A_{12}Y^{12} \quad \text{(I)}$$

In the above expressions, "X (Y)" is a function that represents the amount of displacement of the aspheric surface in the optical axis direction from a reference plane perpendicular to the optical axis, "C" is the curvature at the surface vertex, "Y" is the height (distance) from the optical axis to the aspheric surface in a direction perpendicular to the optical axis, "k" is the conic constant (Conic coefficient), and "An" (n is an integer) is the n-th order aspheric coefficient.

TABLE 3

| No. | k | A4 | A6 |
|---|---|---|---|
| 4 | 1.00 | 2.50647E−02 | −8.83695E−03 |
| 5 | 1.00 | 4.43666E−02 | −2.20647E−02 |
| 6 | 1.00 | −1.67150E−02 | −4.45453E−03 |
| 7 | 1.00 | −2.67290E−02 | −2.25147E−04 |
| 11 | 1.00 | −6.35990E−02 | 1.13840E−02 |
| 12 | 1.00 | −8.03413E−02 | 2.20859E−02 |
| 13 | 1.00 | −4.27954E−02 | 3.38596E−03 |
| 14 | 1.00 | 2.11046E−03 | 0.00000E+00 |

| No. | A8 | A10 | A12 |
|---|---|---|---|
| 4 | 1.12430E−03 | −5.55502E−05 | 0.00000E+00 |
| 5 | 1.82887E−02 | −1.04883E−02 | 0.00000E+00 |
| 6 | −3.47274E−04 | −6.66489E−03 | 0.00000E+00 |
| 7 | −9.65275E−03 | 2.30391E−03 | 0.00000E+00 |
| 11 | 3.34208E−04 | −1.93636E−03 | 0.00000E+00 |
| 12 | −3.64459E−03 | 8.06253E−05 | 0.00000E+00 |
| 13 | 1.17047E−04 | −1.34058E−04 | 0.00000E+00 |
| 14 | 0.00000E+00 | 0.00000E+00 | 0.00000E+00 |

Table 4 illustrates the focal length of each lens of the imaging lens of Example 1.

TABLE 4

| Lens No. | Focal length |
|---|---|
| 1 | −7.659 |
| 2 | −3.231 |
| 3 | 7.192 |
| 4 | 3.253 |
| 5 | −3.043 |

TABLE 4-continued

| Lens No. | Focal length |
|---|---|
| 6 | 2.820 |
| 7 | −8.394 |

Figure 2:
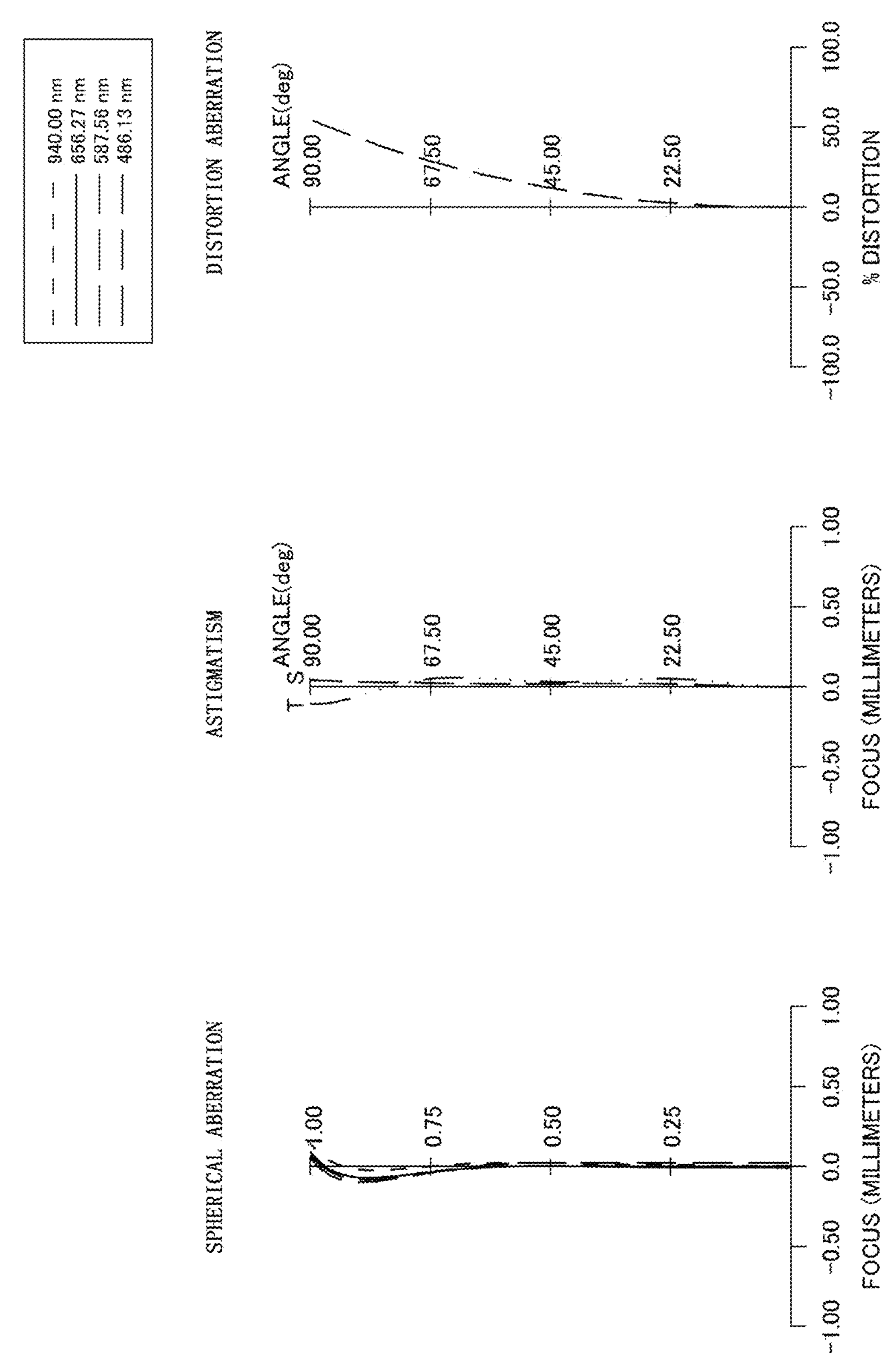
FIG. 2 illustrates spherical aberration diagrams, astigmatism diagrams, and distortion aberration diagrams of the imaging lens according to Example 1.

FIG. 2 is a diagram illustrating longitudinal aberration of the imaging lens of Example 1 during focusing at 700 mm. The longitudinal aberration diagrams illustrated in each figure are, from the left side of the drawing, spherical aberration (mm), astigmatism (mm), and distortion aberration (%). The same applies to the other examples.

In the diagram illustrating spherical aberration, the vertical axis represents the ratio to the open F-number, and the horizontal axis represents defocus. In the diagram illustrating spherical aberration, the chain line illustrates a spherical aberration at the line d (wavelength λ=587.5618 nm), the dotted line illustrates a spherical aberration at wavelength λ=940.0000 nm, the solid line illustrates a spherical aberration at the line C (wavelength λ=656.2725 nm), and the chain line illustrates a spherical aberration at the line F (wavelength λ=486.1327 nm). At the 100% pupil position of the diagram illustrating spherical aberration, there are, from the left side to the right side of the drawing, the chain line indicating the line F, the chain line indicating line d, the solid line indicating the line C, and the dotted line indicating a wavelength λ=940.0000 nm.

In the diagram illustrating astigmatism, the vertical axis represents the angle of view, and the horizontal axis represents the defocus. In the diagram illustrating astigmatism, the dash line indicates the sagittal image plane (S) with respect to line d, and the four-dot chain line indicates the meridional image plane (T) with respect to line d.

In the diagram illustrating distortion aberration, the vertical axis represents the angle of view, and the horizontal axis represents %. In the diagrams illustrating distortion aberration, the chain line indicates distortion aberration at line d.

The above-mentioned explanation regarding the tables and the matters regarding the longitudinal aberration diagrams are similar to those in other embodiments, and therefore are not described below.

Example 2

Figure 3:
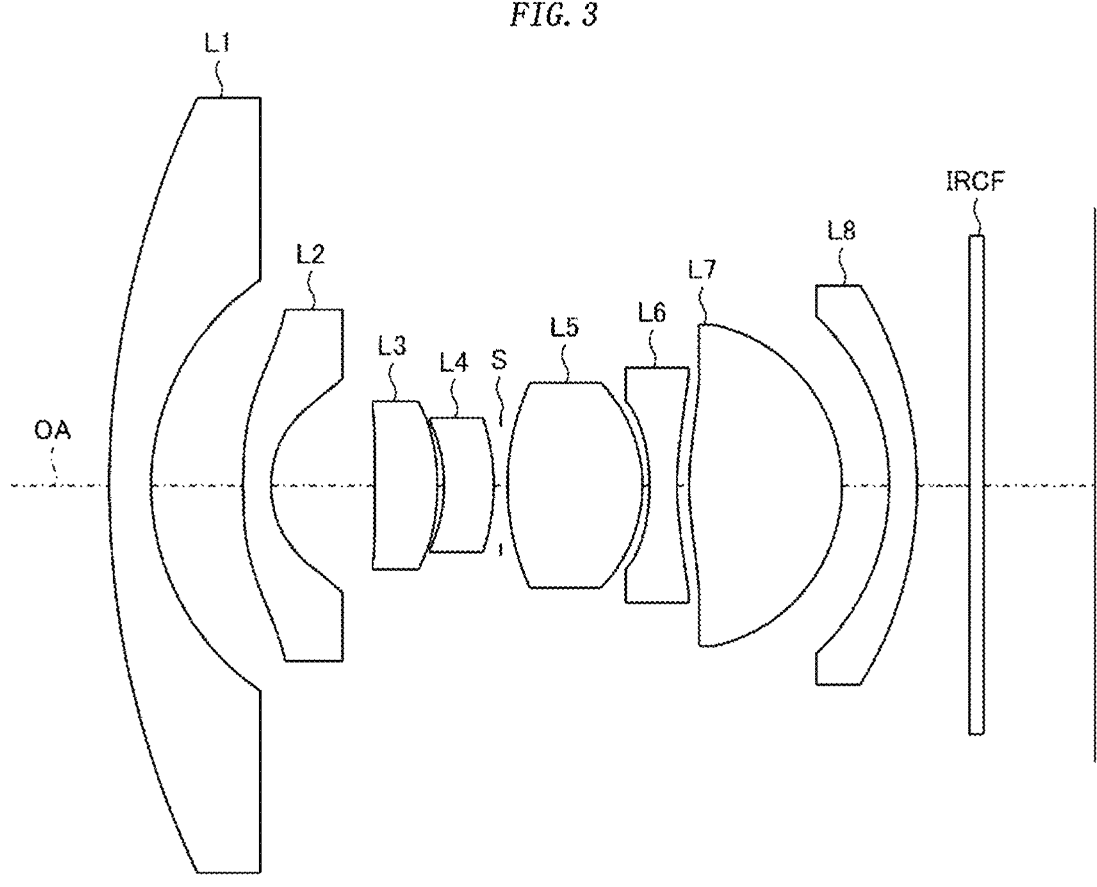
FIG. 3 is a diagram schematically illustrating an optical configuration of the imaging lens of Example 2 during focusing at 700 mm.

FIG. 3 is a diagram schematically illustrating an optical configuration of the imaging lens of Example 2 during focusing at 700 mm. The imaging lens of Example 2 includes, in order from the object side, a first lens L1 having negative refractive power, a second lens L2 having negative refractive power, a third lens L3 having positive refractive power, a fourth lens L4 having positive refractive power, an aperture diaphragm S, a fifth lens L5 having positive refractive power, a sixth lens L6 having negative refractive power, a seventh lens L7 having positive refractive power, and an eighth lens L8 having negative refractive power.

The first lens L1 has a negative meniscus shape and has a convex surface facing the object side. The second lens L2 has a negative meniscus shape and has a convex surface facing the object side. The third lens L3 has a convex surface facing the image surface side. The fourth lens L4 has a concave surface facing the object side and has a convex surface facing the image surface side. The fifth lens L5 has a biconvex shape. The sixth lens L6 has a biconcave shape. The seventh lens L7 has a biconvex shape. The eighth lens L8 has a negative meniscus shape and has a convex surface facing the image surface side.

An aperture diaphragm S is arranged on the image surface side of the fourth lens L4. The first lens L1, the second lens L2, the third lens L3, and the fourth lens L4, which are arranged in the object side from the aperture diaphragm S, constitute the first lens group described above. The fifth lens L5, the sixth lens L6, the seventh lens L7, and the eighth lens L8, which are arranged in the image surface side from the aperture diaphragm S, constitute the second lens group described above. The second lens L2 and the third lens L3 are resin lenses, and the set of these two lenses corresponds to the resin lens set in the object side from the diaphragm described above. The sixth lens L6 and the seventh lens L7 are resin lenses, and the set of these two lenses corresponds to the resin lens set in the image surface side from the diaphragm described above. The eighth lens L8 corresponds to the final lens described above.

Table 5 illustrates the surface data of the imaging lens.

TABLE 5

| No. | ASP | r | d | Nd | vd |
|---|---|---|---|---|---|
| — | | 700 | 700 | | |
| 1 | | 12.909 | 0.600 | 1.5935 | 67.00 |
| 2 | | 3.571 | 1.324 | | |
| 3 | * | 9.143 | 0.403 | 1.5447 | 55.86 |
| 4 | * | 1.623 | 1.504 | | |
| 5 | * | 4157.556 | 0.896 | 1.6393 | 23.35 |
| 6 | * | −3.355 | 0.100 | | |
| 7 | | −2.152 | 0.710 | 1.8042 | 46.50 |
| 8 | | −3.016 | 0.100 | | |
| 9S | | 0.000 | 0.101 | | |
| 10 | | 3.594 | 1.947 | 1.4970 | 81.61 |
| 11 | | −2.099 | 0.100 | | |
| 12 | * | −3.331 | 0.400 | 1.6393 | 23.35 |
| 13 | * | 4.473 | 0.169 | | |
| 14 | * | 4.164 | 2.202 | 1.5447 | 55.86 |
| 15 | * | −2.367 | 0.680 | | |
| 16 | | −3.345 | 0.400 | 1.86970 | 20.02 |
| 17 | | −5.477 | 0.760 | | |
| 18 | | 0.000 | 0.200 | 1.5168 | 64.1983 |
| 19 | | 0.000 | 1.605 | | |

Table 6 illustrates the specifications of the imaging lens of Example 2.

TABLE 6

| | |
|---|---|
| Pieces of lenses | 8 |
| f | 2.008 |
| Fno | 2.200 |
| Cra | 24.6 |

Table 7 illustrates the aspheric coefficients of the aspheric surface in the imaging lens of Example 2.

TABLE 7

| No. | k | A4 | A6 |
|---|---|---|---|
| 3 | 0.00 | 4.34329E−02 | −1.09093E−02 |
| 4 | 0.00 | 5.78845E−02 | −9.81146E−03 |
| 5 | 0.00 | −2.13395E−02 | 1.61479E−02 |
| 6 | 0.00 | −2.55478E−02 | 3.07277E−03 |
| 12 | 0.00 | −4.93431E−02 | 9.95146E−03 |
| 13 | 0.00 | −4.72026E−02 | 2.24194E−02 |
| 14 | 0.00 | −3.81349E−02 | 7.25573E−03 |
| 15 | 0.00 | 1.13085E−03 | 0.00000E+00 |

TABLE 7-continued

| No. | A8 | A10 | A12 |
|---|---|---|---|
| 3 | 1.02587E−03 | −3.63210E−05 | 0.00000E+00 |
| 4 | 1.04755E−02 | −8.19866E−03 | 0.00000E+00 |
| 5 | −2.36362E−02 | 6.46186E−03 | 0.00000E+00 |
| 6 | −8.59780E−03 | 5.25169E−03 | 0.00000E+00 |
| 12 | −3.50929E−03 | −2.65482E−03 | 0.00000E+00 |
| 13 | −5.89121E−03 | 5.00640E−04 | 0.00000E+00 |
| 14 | −1.04660E−03 | −2.66265E−05 | 0.00000E+00 |
| 15 | 0.00000E+00 | 0.00000E+00 | 0.00000E+00 |

Table 8 illustrates the focal length of each lens of the imaging lens of Example 2.

TABLE 8

| Lens No. | Focal length |
|---|---|
| 1 | −8.520 |
| 2 | −3.692 |
| 3 | 5.244 |
| 4 | −14.740 |
| 5 | 3.008 |
| 6 | −2.928 |
| 7 | 3.144 |
| 8 | −10.825 |

Figure 4:
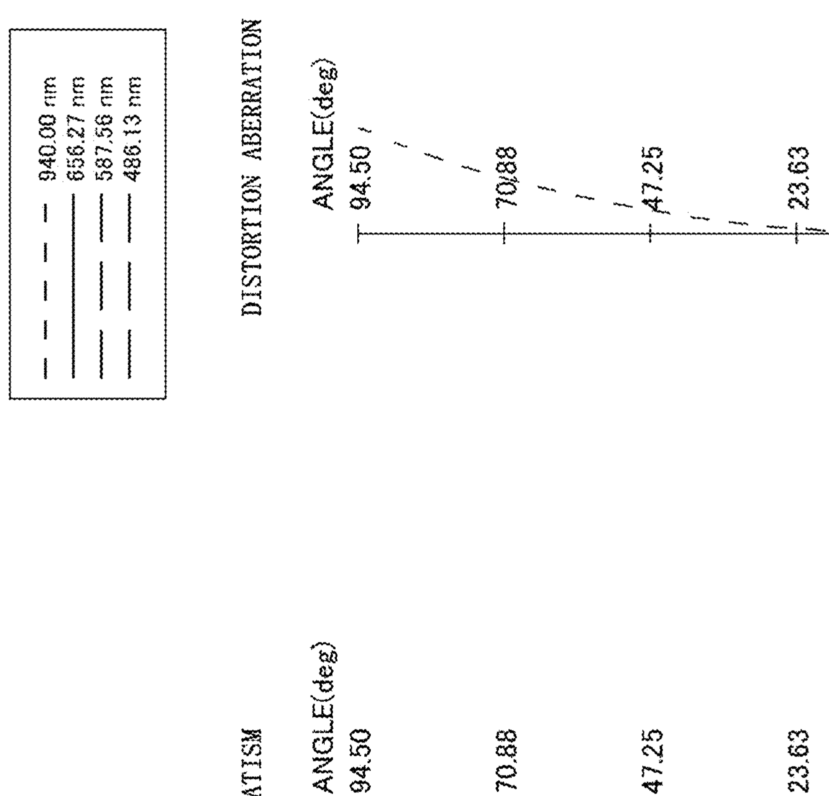
FIG. 4 illustrates spherical aberration diagrams, astigmatism diagrams, and distortion aberration diagrams of the imaging lens according to Example 2.
Figure 4:
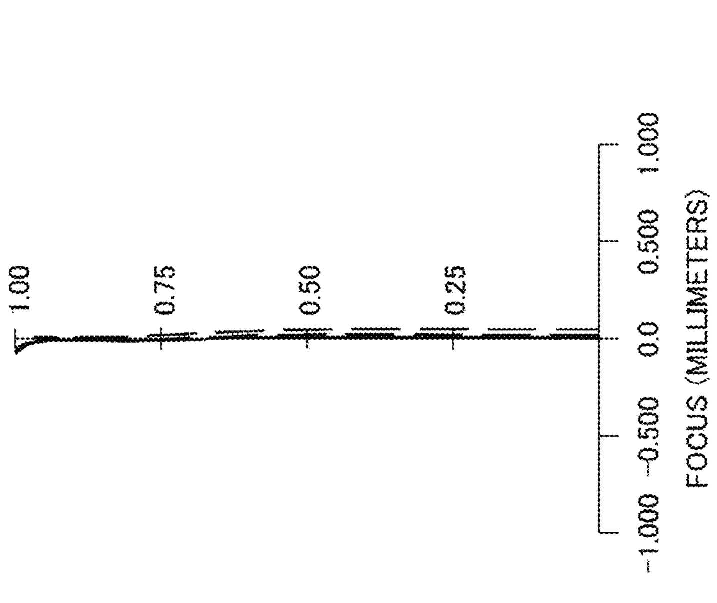

FIG. 4 is a diagram illustrating longitudinal aberration of the imaging lens of Example 2 during focusing at 700 mm.

Example 3

Figure 5:
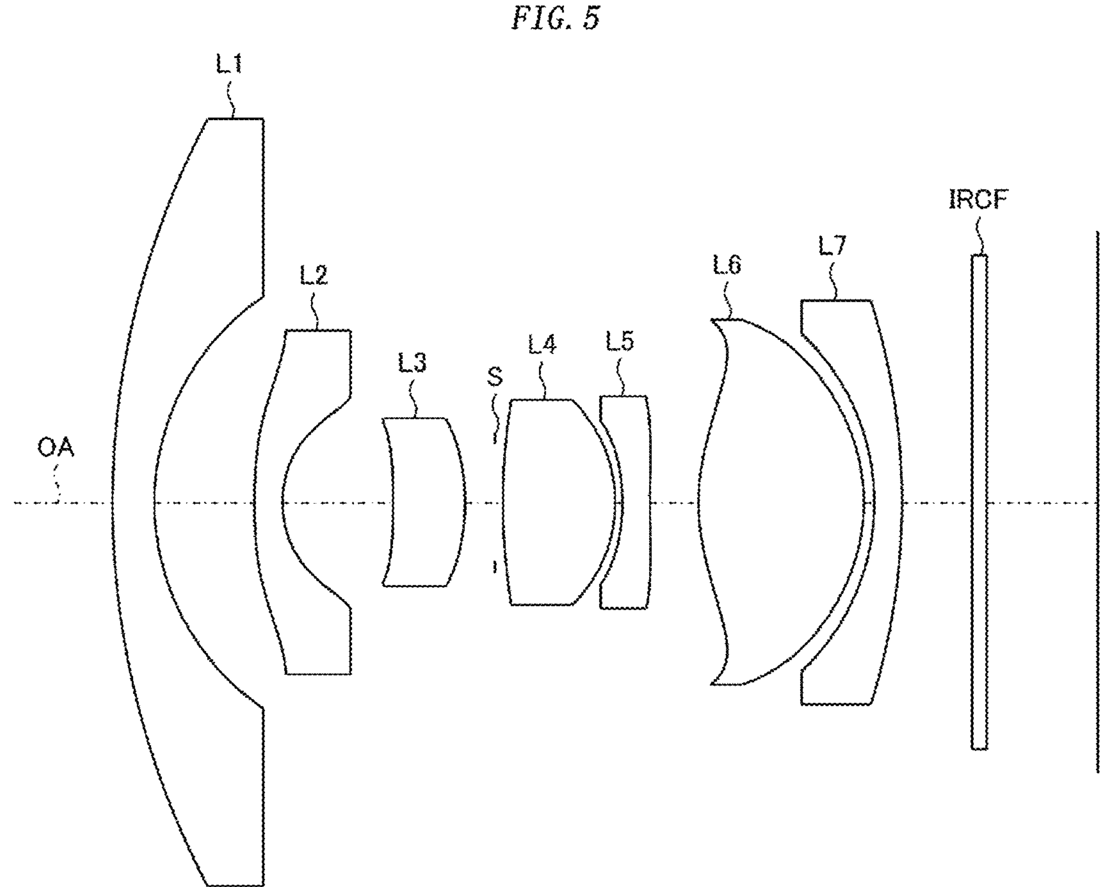
FIG. 5 is a diagram schematically illustrating an optical configuration of the imaging lens of Example 3 during focusing at 700 mm.

FIG. 5 is a diagram schematically illustrating an optical configuration of the imaging lens of Example 3 during focusing at 700 mm. The imaging lens of Example 3 includes, in order from the object side, a first lens L1 having negative refractive power, a second lens L2 having negative refractive power, a third lens L3 having positive refractive power, an aperture diaphragm S, a fourth lens L4 having positive refractive power, a fifth lens L5 having negative refractive power, a sixth lens L6 having positive refractive power, and a seventh lens L7 having negative refractive power.

The first lens L1 has a negative meniscus shape and has a convex surface facing the object side. The second lens L2 has a negative meniscus shape and has a convex surface facing the object side. The third lens L3 has a biconvex shape. The fourth lens L4 has a biconvex shape. The fifth lens L5 has a biconcave shape. The sixth lens L6 has a biconvex shape. The seventh lens L7 has a negative meniscus shape and has a convex surface facing the image surface side.

The aperture diaphragm S is arranged on the image surface side of the third lens L3. The first lens L1, the second lens L2, and the third lens L3, which are arranged in the object side from the aperture diaphragm S, constitute the first lens group described above. The fourth lens L4, fifth lens L5, sixth lens L6, and seventh lens L7, which are arranged in the image surface side from the aperture diaphragm S, constitute the second lens group described above. The second lens L2 and the third lens L3 are resin lenses, and the set of these two lenses corresponds to the resin lens set in the object side from the diaphragm described above. The fifth lens L5 and the sixth lens L6 are resin lenses, and the set of these two lenses corresponds to the resin lens set in the image surface side from the diaphragm described above. The seventh lens L7 corresponds to the final lens described above.

Table 9 illustrates the surface data of the imaging lens.

TABLE 9

| No. | ASP | r | d | Nd | vd |
|---|---|---|---|---|---|
| — | | 700 | 700 | | |
| 1 | | 11.839 | 0.600 | 1.6200 | 63.88 |
| 2 | | 3.588 | 1.324 | | |
| 3 | * | 11.437 | 0.403 | 1.5447 | 55.86 |
| 4 | * | 1.613 | 1.504 | | |
| 5 | * | −10.539 | 0.896 | 1.6393 | 23.35 |
| 6 | * | −3.239 | 0.100 | | |
| 7S | | 0.000 | 0.710 | | |
| 8 | | 9.000 | 0.100 | 1.5503 | 75.50 |
| 9 | | −2.078 | 0.101 | | |
| 10 | * | −3.060 | 1.947 | 1.6393 | 23.35 |
| 11 | * | 11.133 | 0.100 | | |
| 12 | * | 2.915 | 0.400 | 1.5447 | 55.86 |
| 13 | * | −2.741 | 0.169 | | |
| 14 | | −3.357 | 2.202 | 1.9229 | 20.88 |
| 15 | | −9.623 | 0.680 | | |
| 16 | | 0.000 | 0.400 | 1.51680 | 64.20 |
| 17 | | 0.000 | 0.760 | | |

Table 10 illustrates the specifications of the imaging lens of Example 3.

TABLE 10

| | |
|---|---|
| Pieces of lenses | 7 |
| f | 2.075 |
| Fno | 2.200 |
| Cra | 24.6 |

Table 11 illustrates the aspheric coefficients of the aspheric surface in the imaging lens of Example 3.

TABLE 11

| No. | k | A4 | A6 |
|---|---|---|---|
| 3 | 1.00 | 3.88181E−02 | −1.01334E−02 |
| 4 | 1.00 | 5.72648E−02 | −1.57647E−02 |
| 5 | 1.00 | −2.90574E−02 | 9.23880E−03 |
| 6 | 1.00 | −1.60128E−02 | −9.81503E−04 |
| 12 | 1.00 | −4.74609E−02 | 9.55501E−03 |
| 13 | 1.00 | −5.80763E−02 | 2.23862E−02 |
| 14 | 1.00 | −2.99392E−02 | 3.60730E−03 |
| 15 | 1.00 | 4.24887E−03 | 0.00000E+00 |

| No. | A8 | A10 | A12 |
|---|---|---|---|
| 3 | 9.94153E−04 | −3.99216E−05 | 0.00000E+00 |
| 4 | 1.83197E−02 | −1.10399E−02 | 0.00000E+00 |
| 5 | −2.08015E−02 | 4.72637E−03 | 0.00000E+00 |
| 6 | −5.17960E−03 | 3.16928E−03 | 0.00000E+00 |
| 12 | 2.26591E−03 | −3.31927E−03 | 0.00000E+00 |
| 13 | −5.37105E−03 | 4.13436E−04 | 0.00000E+00 |
| 14 | −5.16583E−04 | −3.50694E−06 | 0.00000E+00 |
| 15 | 0.00000E+00 | 0.00000E+00 | 0.00000E+00 |

Table 12 illustrates the focal length of each lens of the imaging lens of Example 3.

TABLE 12

| Lens No. | Focal length |
|---|---|
| 1 | −8.541 |
| 2 | −3.499 |
| 3 | 6.932 |
| 4 | 3.235 |
| 5 | −3.714 |

TABLE 12-continued

| Lens No. | Focal length |
|---|---|
| 6 | 3.046 |
| 7 | −5.762 |

Figure 6:
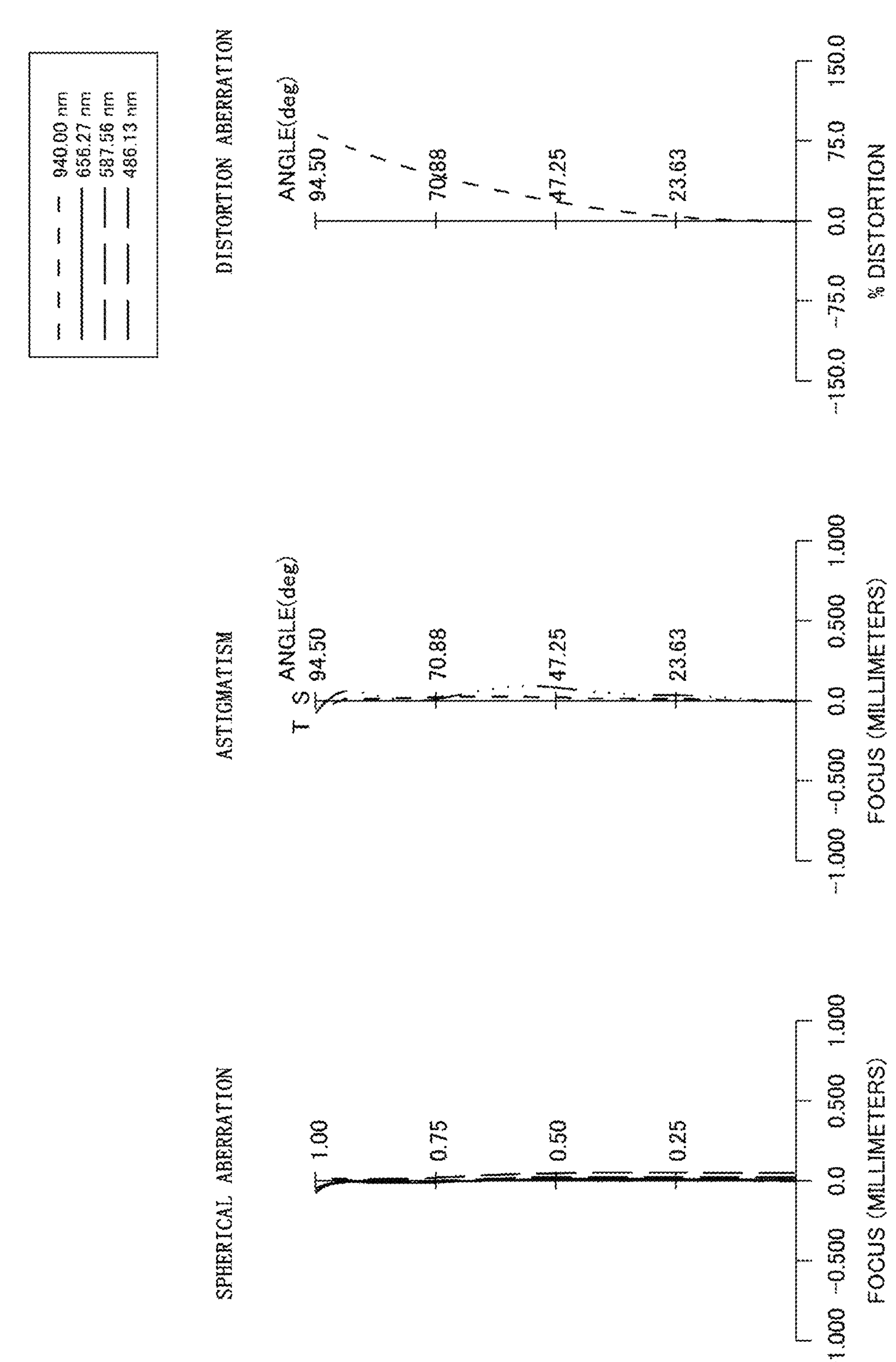
FIG. 6 illustrates spherical aberration diagrams, astigmatism diagrams, and distortion aberration diagrams of the imaging lens according to Example 3.

FIG. 6 is a diagram illustrating longitudinal aberration of the imaging lens of Example 3 during focusing at 700 mm.

Example 4

Figure 7:
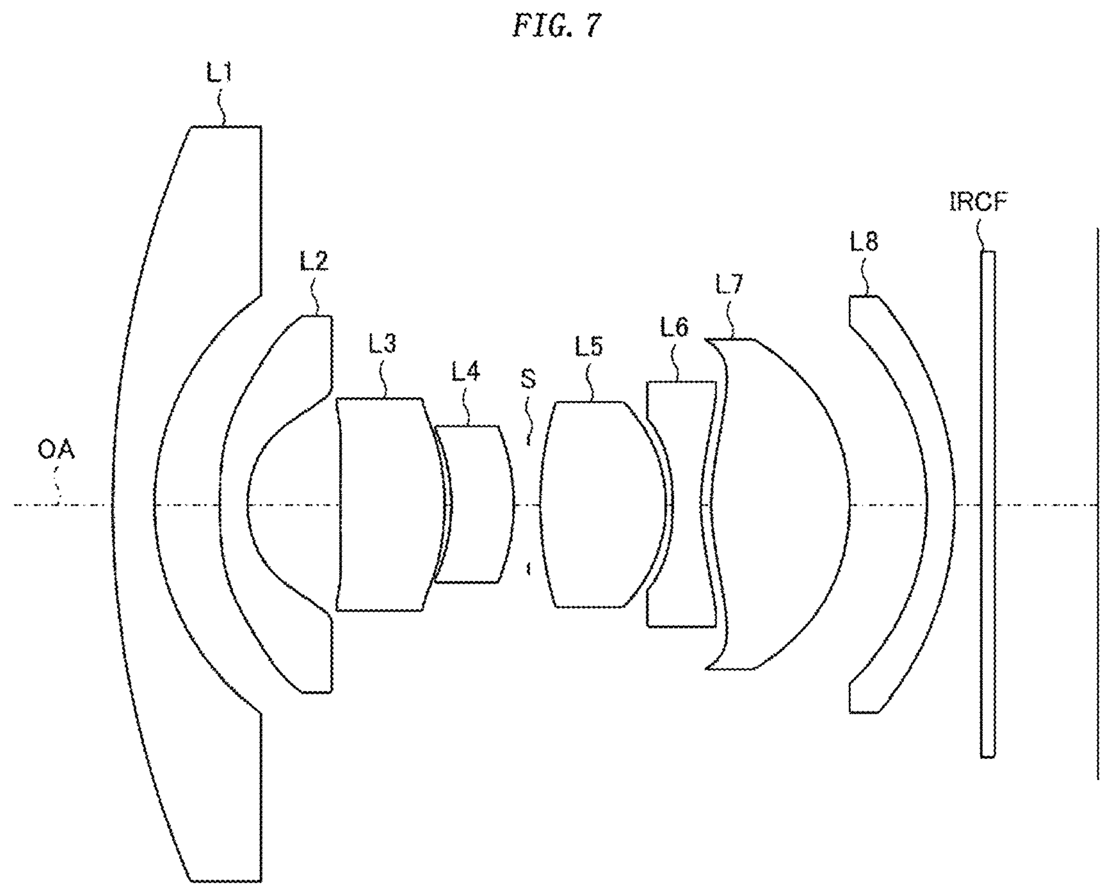
FIG. 7 is a diagram schematically illustrating an optical configuration of the imaging lens of Example 4 during focusing at 700 mm.

FIG. 7 is a diagram schematically illustrating an optical configuration of the imaging lens of Example 4 during focusing at 700 mm. The imaging lens of Example 4 includes, in order from the object side, a first lens L1 having negative refractive power, a second lens L2 having negative refractive power, a third lens L3 having positive refractive power, a fourth lens L4 having positive refractive power, an aperture diaphragm S, a fifth lens L5 having positive refractive power, a sixth lens L6 having negative refractive power, a seventh lens L7 having positive refractive power, and an eighth lens L8 having negative refractive power.

The first lens L1 has a negative meniscus shape and has a convex surface facing the object side. The second lens L2 has a negative meniscus shape and has a convex surface facing the object side. The third lens L3 has a convex surface facing the image surface side. The fourth lens L4 has a concave surface facing the object side and has a convex surface facing the image surface side. The fifth lens L5 has a biconvex shape. The sixth lens L6 has a biconcave shape. The seventh lens L7 has a biconvex shape. The eighth lens L8 has a negative meniscus shape and has a convex surface facing the image surface side.

The aperture diaphragm S is arranged on the image surface side of the fourth lens L4. The first lens L1, the second lens L2, the third lens L3, and the fourth lens L4, which are arranged in the object side from the aperture diaphragm S, constitute the first lens group described above. The fifth lens L5, the sixth lens L6, the seventh lens L7, and the eighth lens L8, which are arranged in the image surface side from the aperture diaphragm S, constitute the second lens group described above. The second lens L2 and the third lens L3 are resin lenses, and the set of these two lenses corresponds to the resin lens set in the object side from the diaphragm described above. The sixth lens L6 and the seventh lens L7 are resin lenses, and the set of these two lenses corresponds to the resin lens set in the image surface side from the diaphragm described above. The eighth lens L8 corresponds to the final lens described above.

Table 13 illustrates the surface data of the imaging lens.

TABLE 13

| No. | ASP | r | d | Nd | vd |
|---|---|---|---|---|---|
| — | | 700 | 700 | | |
| 1 | | 13.723 | 0.600 | 1.6658 | 58.61 |
| 2 | | 3.723 | 0.943 | | |
| 3 | * | 10.464 | 0.400 | 1.5447 | 55.86 |
| 4 | * | 1.746 | 1.342 | | |
| 5 | * | 22.362 | 1.501 | 1.6150 | 25.92 |
| 6 | * | −3.641 | 0.100 | | |
| 7 | | −2.549 | 0.892 | 1.8042 | 46.50 |
| 8 | | −2.906 | 0.213 | | |
| 9S | | 0.000 | 0.167 | | |
| 10 | | 4.988 | 1.819 | 1.4970 | 81.61 |
| 11 | | −2.078 | 0.100 | | |
| 12 | * | −3.067 | 0.400 | 1.6150 | 25.92 |
| 13 | * | 2.998 | 0.150 | | |

TABLE 13-continued

| No. | ASP | r | d | Nd | vd |
|---|---|---|---|---|---|
| 14 | * | 3.120 | 1.994 | 1.5447 | 55.86 |
| 15 | * | −3.031 | 1.112 | | |
| 16 | | −3.551 | 0.400 | 1.86966 | 20.02 |
| 17 | | −4.649 | 0.382 | | |
| 18 | | 0.000 | 0.200 | 1.5168 | 64.2 |
| 19 | | 0.000 | 1.485 | | |

Table 14 illustrates the specifications of the imaging lens of Example 4.

TABLE 14

| | |
|---|---|
| Pieces of lenses | 8 |
| f | 2.008 |
| Fno | 2.200 |
| Cra | 24.2 |

Table 15 illustrates the aspheric coefficients of the aspheric surface in the imaging lens of Example 4.

TABLE 15

| No. | k | A4 | A6 |
|---|---|---|---|
| 3 | 0.00 | 5.76974E−02 | −1.13293E−02 |
| 4 | 0.00 | 7.46640E−02 | 3.61940E−04 |
| 5 | 0.00 | −2.25686E−02 | 1.29945E−02 |
| 6 | 0.00 | −1.62728E−02 | −1.14381E−03 |
| 12 | 0.00 | −4.48688E−02 | 5.40349E−03 |
| 13 | 0.00 | −6.40088E−02 | 1.90932E−02 |
| 14 | 0.00 | −5.46232E−02 | 1.14626E−02 |
| 15 | 0.00 | −7.43967E−03 | 0.00000E+00 |

| No. | A8 | A10 | A12 |
|---|---|---|---|
| 3 | 6.91942E−04 | 9.03814E−06 | 0.00000E+00 |
| 4 | 7.98953E−03 | −6.47631E−03 | 0.00000E+00 |
| 5 | −1.34791E−02 | 2.93638E−03 | 0.00000E+00 |
| 6 | 2.85621E−03 | 3.90043E−04 | 0.00000E+00 |
| 12 | −7.14006E−03 | 1.05274E−03 | 0.00000E+00 |
| 13 | −4.07592E−03 | 2.73659E−04 | 0.00000E+00 |
| 14 | −1.43129E−03 | −9.34161E−06 | 0.00000E+00 |
| 15 | 0.00000E+00 | 0.00000E+00 | 0.00000E+00 |

Table 16 illustrates the focal length of each lens of the imaging lens of Example 4.

TABLE 16

| Lens No. | Focal length |
|---|---|
| 1 | −7.861 |
| 2 | −3.911 |
| 3 | 5.206 |
| 4 | 225.846 |
| 5 | 3.228 |
| 6 | −2.405 |
| 7 | 3.187 |
| 8 | −20.835 |

FIG. 8 is a diagram illustrating longitudinal aberration of the imaging lens of Example 4 during focusing at 700 mm.

Example 5

Figure 9:
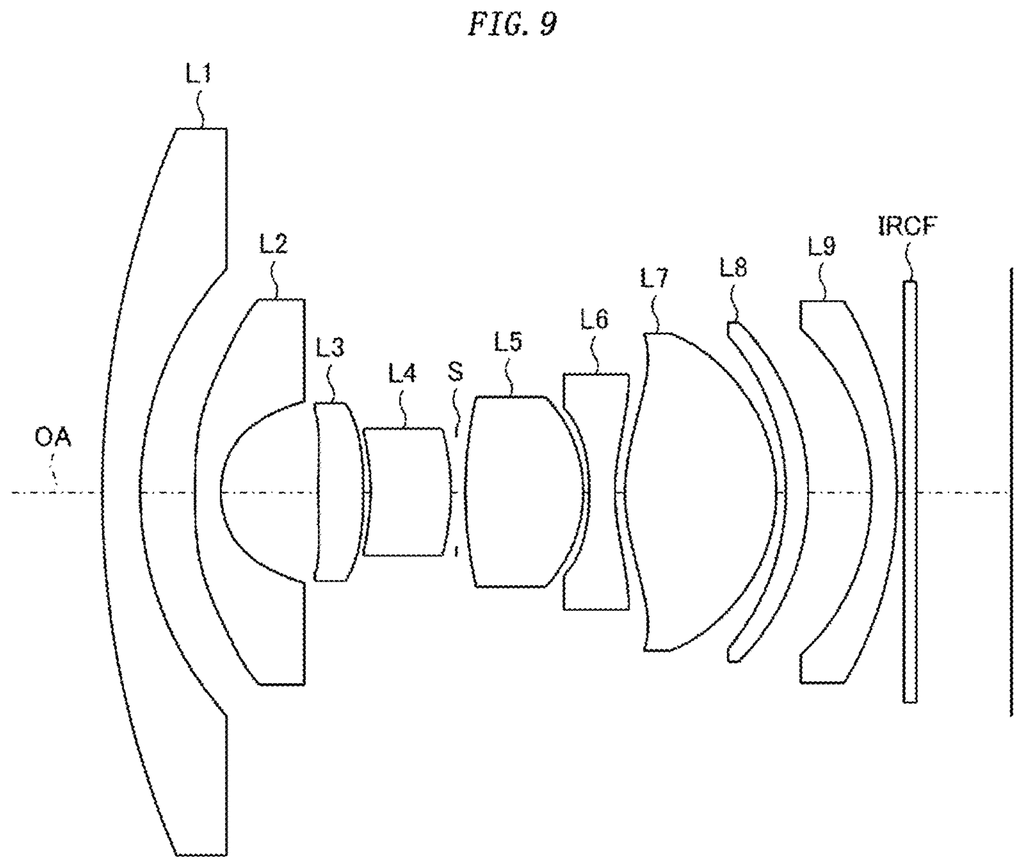
FIG. 9 is a diagram schematically illustrating an optical configuration of the imaging lens of Example 5 during focusing at 700 mm.

FIG. 9 is a diagram schematically illustrating an optical configuration of the imaging lens of Example 5 during focusing at 700 mm. The imaging lens of Example 5 includes, in order from the object side, a first lens L1 having negative refractive power, a second lens L2 having negative refractive power, a third lens L3 having positive refractive power, a fourth lens L4 having positive refractive power, an aperture diaphragm S, a fifth lens L5 having positive refractive power, a sixth lens L6 having negative refractive power, a seventh lens L7 having positive refractive power, an eighth lens L8 having positive refractive power, and a ninth lens L9 having negative refractive power.

The first lens L1 has a negative meniscus shape and has a convex surface facing the object side. The second lens L2 has a negative meniscus shape and has a convex surface facing the object side. The third lens L3 has a biconvex shape. The fourth lens L4 has a concave surface facing the object side and has a convex surface facing the image surface side. The fifth lens L5 has a biconvex shape. The sixth lens L6 has a biconcave shape. The seventh lens L7 has a biconvex shape. The eighth lens L8 has a negative meniscus shape and has a convex surface facing the image surface side. The ninth lens L9 has a negative meniscus shape and has a convex surface facing the image surface side.

The aperture diaphragm S is arranged on the image surface side of the fourth lens L4. The first lens L1, the second lens L2, the third lens L3, and the fourth lens L4, which are arranged in the object side from the aperture diaphragm S, constitute the first lens group described above. The fifth lens L5, the sixth lens L6, the seventh lens L7, the eighth lens L8, and the ninth lens L9, which are arranged in the image surface side from the aperture diaphragm S, constitute the second lens group described above. The second lens L2 and the third lens L3 are resin lenses, and the set of these two lenses corresponds to the resin lens set in the object side from the diaphragm described above. The sixth lens L6 and the seventh lens L7 are resin lenses, and the set of these two lenses corresponds to the resin lens set in the image surface side from the diaphragm described above. The ninth lens L9 corresponds to the final lens described above.

Table 17 illustrates the surface data of the imaging lens.

TABLE 17

| No. | ASP | r | d | Nd | vd |
|---|---|---|---|---|---|
| — | | 700 | 700 | | |
| 1 | | 14.377 | 0.600 | 1.5153 | 77.36 |
| 2 | | 5.211 | 0.855 | | |
| 3 | * | 21.522 | 0.400 | 1.5447 | 55.86 |
| 4 | * | 1.517 | 1.517 | | |
| 5 | * | 15.913 | 0.707 | 1.6150 | 25.92 |
| 6 | * | −6.647 | 0.110 | | |
| 7 | | −4.002 | 1.252 | | |
| 8 | | −3.679 | 0.100 | 1.8042 | 46.50 |
| 9S | | 0.000 | 0.125 | | |
| 10 | | 6.302 | 1.844 | 1.4970 | 81.61 |
| 11 | | −2.160 | 0.100 | | |
| 12 | * | −3.590 | 0.400 | 1.6150 | 25.92 |
| 13 | * | 2.992 | 0.150 | | |
| 14 | * | 2.701 | 2.364 | 1.5447 | 55.86 |
| 15 | * | −2.603 | 0.150 | | |
| 16 | | −3.768 | 0.350 | 1.54472 | 55.86 |
| 17 | | −3.768 | 0.990 | | |
| 18 | | −3.467 | 0.400 | 1.86966 | 20.02 |
| 19 | | −5.758 | 0.100 | | |
| 20 | | 0 | 0.2 | 1.5168 | 64.2 |
| 21 | | 0 | 1 | | |

Table 18 illustrates the specifications of the imaging lens of Example 5.

TABLE 18

| | |
|---|---|
| Pieces of lenses | 9 |
| f | 2.114 |

TABLE 18-continued

| | |
|---|---|
| Fno | 2.200 |
| Cra | 19.9 |

Table 19 illustrates the aspheric coefficients of the aspheric surface in the imaging lens of Example 5.

TABLE 19

| No. | k | A4 | A6 |
|---|---|---|---|
| 3 | 0.00 | 4.54977E−02 | −9.17597E−03 |
| 4 | 0.00 | 5.20719E−02 | 1.42040E−02 |
| 5 | 0.00 | −3.28118E−02 | 1.26241E−02 |
| 6 | 0.00 | −3.12041E−02 | −1.40248E−03 |
| 12 | 0.00 | −4.89295E−02 | 5.79219E−03 |
| 13 | 0.00 | −6.67060E−02 | 1.91310E−02 |
| 14 | 0.00 | −5.04112E−02 | 9.66764E−03 |
| 15 | 0.00 | −1.18329E−04 | 0.000475472 |

| No. | A8 | A10 | A12 |
|---|---|---|---|
| 3 | 7.71714E−04 | −2.16987E−05 | 0.00000E+00 |
| 4 | 1.01296E−02 | −5.23608E−03 | 0.00000E+00 |
| 5 | −1.45381E−02 | 2.59097E−03 | 0.00000E+00 |
| 6 | −1.62432E−03 | 5.10821E−04 | 0.00000E+00 |
| 12 | −3.96578E−03 | 3.09741E−04 | 0.00000E+00 |
| 13 | −4.23502E−03 | 3.70172E−04 | 0.00000E+00 |
| 14 | −1.63149E−03 | 7.53320E−05 | 0.00000E+00 |
| 15 | 2.13915E−05 | 0.00000E+00 | 0.00000E+00 |

Table 20 illustrates the focal length of each lens of the imaging lens of Example 5.

TABLE 20

| Lens No. | Focal length |
|---|---|
| 1 | −16.223 |
| 2 | −3.018 |
| 3 | 7.716 |
| 4 | 20.777 |
| 5 | 3.489 |
| 6 | −2.593 |
| 7 | 2.888 |
| 8 | 211.234 |
| 9 | −10.901 |

Figure 10:
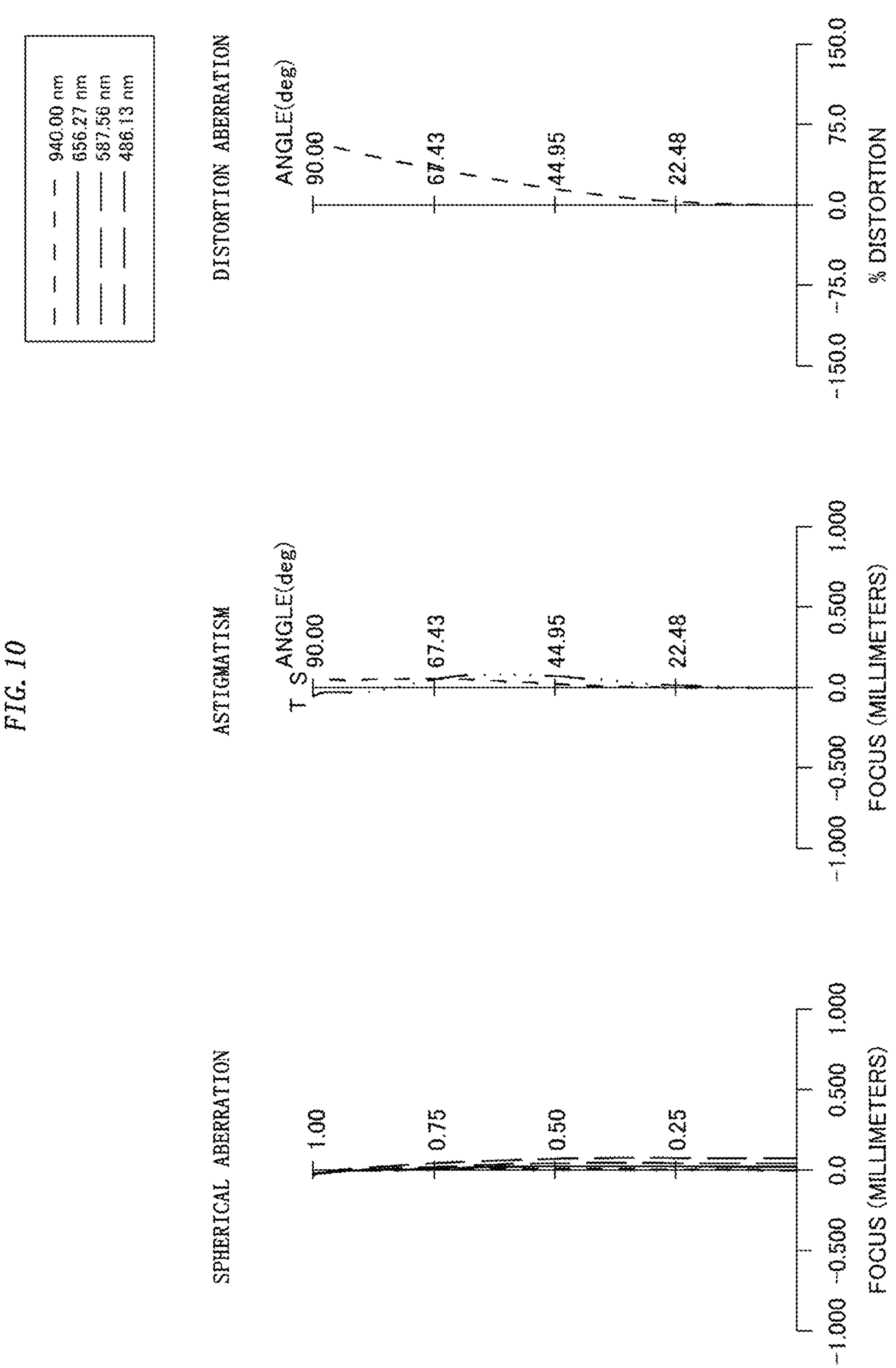
FIG. 10 illustrates spherical aberration diagrams, astigmatism diagrams, and distortion aberration diagrams of the imaging lens according to Example 5.

FIG. 10 is a diagram illustrating longitudinal aberration of the imaging lens of Example 5 during focusing at 700 mm.

Example 6

Figure 11:
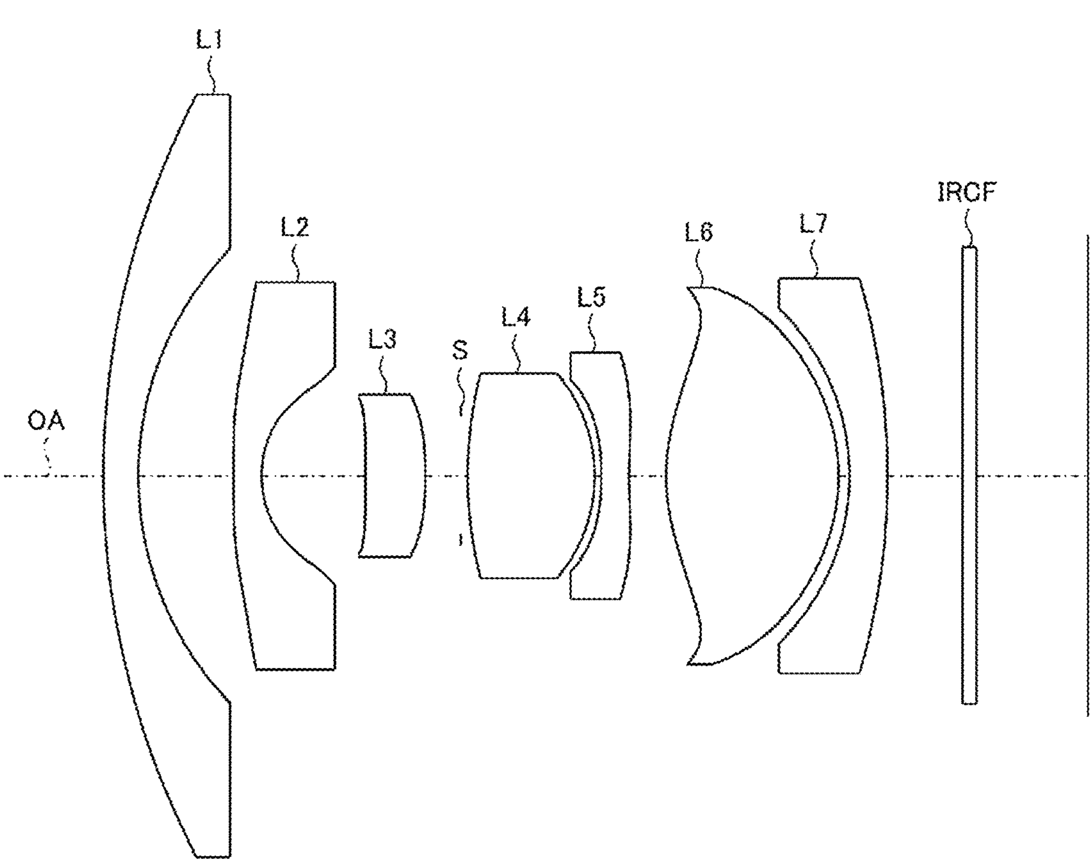
FIG. 11 is a diagram schematically illustrating an optical configuration of the imaging lens of Example 6 during focusing at 700 mm.

FIG. 11 is a diagram schematically illustrating an optical configuration of the imaging lens of Example 6 during focusing at 700 mm. The imaging lens of Example 11 includes, in order from the object side, a first lens L1 having negative refractive power, a second lens L2 having negative refractive power, a third lens L3 having positive refractive power, an aperture diaphragm S, a fourth lens L4 having positive refractive power, a fifth lens L5 having negative refractive power, a sixth lens L6 having positive refractive power, and a seventh lens L7 having negative refractive power.

The first lens L1 has a negative meniscus shape and has a convex surface facing the object side. The second lens L2 has a negative meniscus shape and has a convex surface facing the object side. The third lens L3 has a biconvex shape. The fourth lens L4 has a biconvex shape. The fifth lens L5 has a negative meniscus shape and has a concave surface facing the object side. The sixth lens L6 has a biconvex shape. The seventh lens L7 has a negative meniscus shape and has a convex surface facing the image surface side.

The aperture diaphragm S is arranged on the image surface side of the third lens L3. The first lens L1, the second lens L2, and the third lens L3, which are arranged in the object side from the aperture diaphragm S, constitute the first lens group described above. The fourth lens L4, the fifth lens L5, the sixth lens L6, and the seventh lens L7, which are arranged in the image surface side from the aperture diaphragm S, constitute the second lens group described above. The second lens L2 and the third lens L3 are resin lenses, and the set of these two lenses corresponds to the resin lens set in the object side from the diaphragm described above. The sixth lens L6 and the seventh lens L7 are resin lenses, and the set of these two lenses corresponds to the resin lens set in the image surface side from the diaphragm described above. The seventh lens L7 corresponds to the final lens described above.

Table 21 illustrates the surface data of the imaging lens.

TABLE 21

| No. | ASP | r | d | Nd | vd |
|---|---|---|---|---|---|
| — | | 700 | 700 | | |
| 1 | | 11.901 | 0.509 | 1.6310 | 61.56 |
| 2 | | 4.717 | 1.375 | | |
| 3 | * | 153.743 | 0.400 | 1.5447 | 55.86 |
| 4 | * | 1.613 | 1.500 | | |
| 5 | * | −140.886 | 0.869 | 1.6393 | 23.35 |
| 6 | * | −4.939 | 0.505 | | |
| 7S | | 0.000 | 0.101 | | |
| 8 | | 5.958 | 1.828 | 1.5334 | 73.35 |
| 9 | | −2.288 | 0.100 | | |
| 10 | | −4.073 | 0.400 | 1.6393 | 23.35 |
| 11 | | 7.476 | 0.532 | | |
| 12 | * | 2.878 | 2.484 | 1.5447 | 55.86 |
| 13 | * | −2.816 | 0.154 | | |
| 14 | * | −3.377 | 0.553 | 1.8808 | 21.64 |
| 15 | * | −10.097 | 1.079 | | |
| 16 | | 0.000 | 0.200 | 1.5168 | 64.2 |
| 17 | | 0.000 | 1.605 | | |

Table 22 illustrates the specifications of the imaging lens of Example 6.

TABLE 22

| | |
|---|---|
| Pieces of lenses | 7 |
| f | 2.373 |
| Fno | 2.200 |
| Cra | 18.1 |

Table 23 illustrates the aspheric coefficients of the aspheric surface in the imaging lens of Example 6.

TABLE 23

| No. | k | A4 | A6 |
|---|---|---|---|
| 3 | 0.00 | 3.41605E−02 | −9.38512E−03 |
| 4 | 0.00 | 5.42453E−02 | −9.82771E−03 |
| 5 | 0.00 | −2.81801E−02 | 8.39836E−04 |
| 6 | 0.00 | −2.99399E−02 | −4.00991E−03 |
| 12 | 0.00 | −6.74428E−02 | 6.64651E−03 |
| 13 | 0.00 | −7.44753E−02 | 2.30208E−02 |
| 14 | 0.00 | −2.64051E−02 | 2.52014E−03 |
| 15 | 0.00 | 4.57690E−03 | 0.00000E+00 |

TABLE 23-continued

| No. | A8 | A10 | A12 |
| --- | --- | --- | --- |
| 3 | 1.06983E−03 | −4.46362E−05 | 1.33143E−10 |
| 4 | 1.97579E−02 | −1.20816E−02 | 0.00000E+00 |
| 5 | −1.52157E−02 | −3.87612E−04 | 0.00000E+00 |
| 6 | −8.12563E−03 | 2.91819E−03 | 0.00000E+00 |
| 12 | 3.78433E−03 | −2.05204E−03 | 0.00000E+00 |
| 13 | −4.76512E−03 | 4.64894E−04 | 0.00000E+00 |
| 14 | −2.40136E−04 | −2.24746E−05 | 0.00000E+00 |
| 15 | 0.00000E+00 | 0.00000E+00 | 0.00000E+00 |

Table 24 illustrates the focal length of each lens of the imaging lens of Example 6.

TABLE 24

| Lens No. | Focal length |
| --- | --- |
| 1 | −12.732 |
| 2 | −2.995 |
| 3 | 7.988 |
| 4 | 3.358 |
| 5 | −4.069 |
| 6 | 3.088 |
| 7 | −5.992 |

Figure 12:
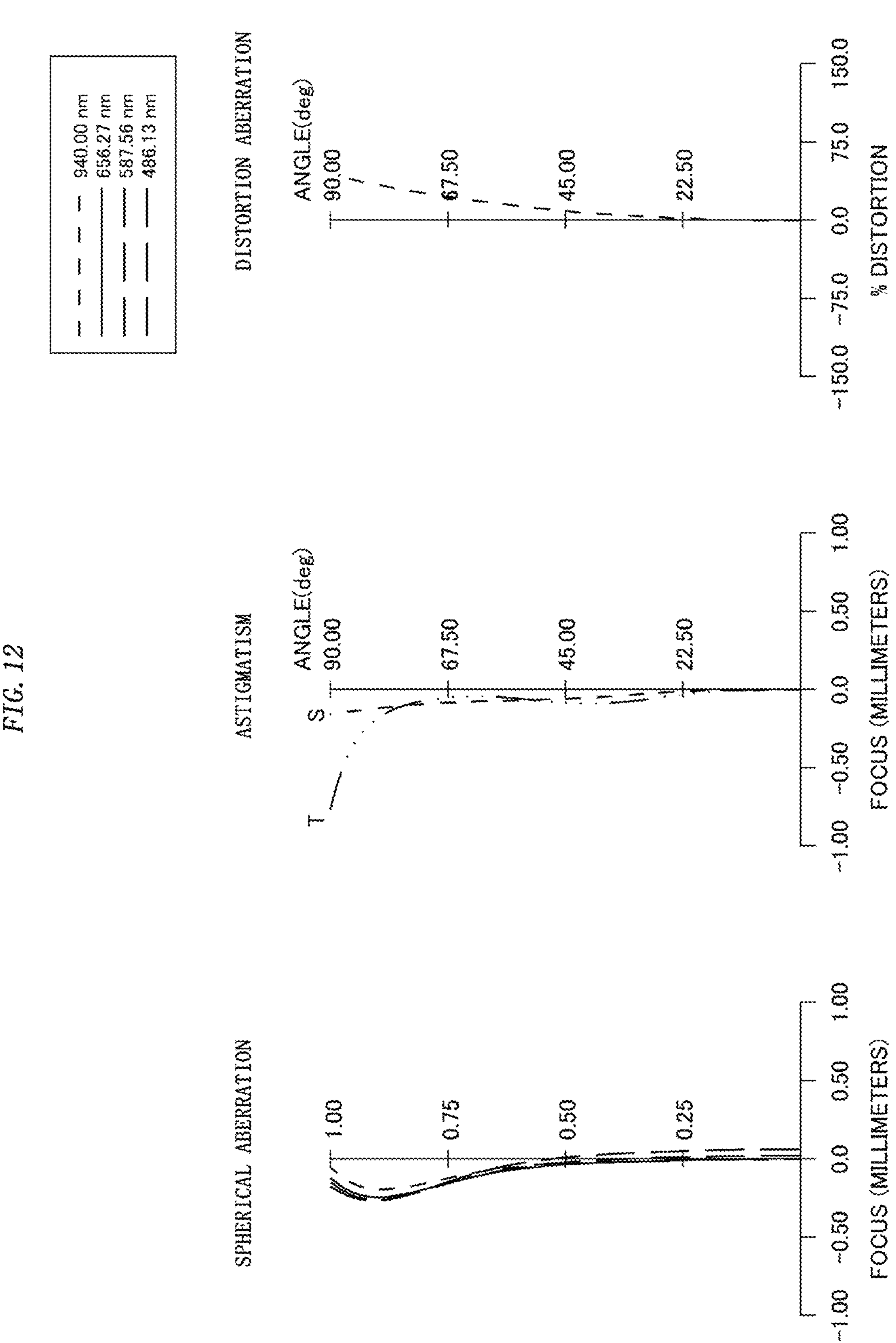
FIG. 12 illustrates spherical aberration diagrams, astigmatism diagrams, and distortion aberration diagrams of the imaging lens according to Example 6.

FIG. 12 is a diagram illustrating longitudinal aberration of the imaging lens of Example 6 during focusing at 700 mm.

The values calculated by the above expressions in Examples 1 to 6 are illustrated in Table 25.

TABLE 25

| | Example 1 | Example 2 | Example 3 |
| --- | --- | --- | --- |
| Expression (1) | −0.216 | 0.046 | −0.087 |
| Expression (2) | 0.353 | 0.245 | 0.457 |
| Expression (3) | −1.480 | −1.838 | −1.686 |
| Expression (4) | −3.845 | −5.391 | −2.776 |
| Expression (5) | 0.544 | 0.647 | 0.691 |
| Expression (6) | 0.361 | 0.446 | 0.432 |
| Expression (7) | 1.747 | 1.988 | 1.874 |
| Expression (8) | −3.508 | −4.243 | −4.115 |
| Expression (9) | 6.505 | 7.071 | 6.842 |
| Expression (10) | −0.613 | −1.176 | −0.631 |
| Expression (11) | 1.779 | 1.765 | 1.870 |
| Expression (12) | 63.880 | 67.002 | 63.880 |
| Expression (13) | 23.352 | 23.352 | 23.352 |

TABLE 25-continued

| | | | |
| --- | --- | --- | --- |
| Expression (14) | 1.620 | 1.594 | 1.620 |
| Expression (15) | 0.795 | 0.819 | 0.743 |
| Expression (16) | 0.070 | 0.084 | 0.048 |
| Expression (17) | 1.304 | 1.243 | 0.821 |

Examples 4-6 are as follows.

| | Example 4 | Example 5 | Example 6 |
| --- | --- | --- | --- |
| Expression (1) | 0.080 | −0.268 | −0.292 |
| Expression (2) | 0.059 | 0.255 | 0.493 |
| Expression (3) | −1.948 | −1.427 | −1.262 |
| Expression (4) | −10.006 | −5.172 | −2.525 |
| Expression (5) | 0.947 | 0.524 | 0.535 |
| Expression (6) | 0.747 | 0.334 | 0.366 |
| Expression (7) | 1.975 | 1.605 | 1.399 |
| Expression (8) | −3.914 | −7.673 | −5.365 |
| Expression (9) | 7.071 | 6.716 | 5.981 |
| Expression (10) | −1.338 | −0.908 | −0.712 |
| Expression (11) | 1.744 | 2.137 | 2.313 |
| Expression (12) | 58.610 | 77.360 | 61.560 |
| Expression (13) | 25.920 | 25.920 | 23.350 |
| Expression (14) | 1.666 | 1.515 | 1.631 |
| Expression (15) | 0.854 | 0.874 | 0.797 |
| Expression (16) | 0.075 | 0.071 | 0.224 |
| Expression (17) | 0.995 | 0.583 | 1.187 |

The values used in the above expressions in Examples 1 to 6 are illustrated in Table 26.

TABLE 26

| | Example 1 | Example 2 | Example 3 | Example 4 | Example 5 | Example 6 |
| --- | --- | --- | --- | --- | --- | --- |
| f | 2.183 | 2.008 | 2.075 | 2.008 | 2.114 | 2.373 |
| Φ2pf | −0.099 | 0.023 | −0.042 | 0.040 | −0.127 | −0.123 |
| Φ2pb | 0.162 | 0.122 | 0.220 | 0.030 | 0.120 | 0.208 |
| f2 | −3.231 | −3.692 | −3.499 | −3.911 | −3.018 | −2.995 |
| fL | −8.394 | −10.825 | −5.762 | −20.835 | −10.901 | −5.992 |
| Dp | 1.188 | 1.300 | 1.434 | 1.901 | 1.107 | 1.269 |
| Dp2 | 0.788 | 0.896 | 0.896 | 1.501 | 0.707 | 0.869 |
| ImgH | 3.814 | 3.992 | 3.889 | 3.967 | 3.394 | 3.321 |
| f1 | −7.659 | −8.520 | −8.541 | −7.861 | −16.223 | −12.732 |
| TL | 14.200 | 14.200 | 14.200 | 14.200 | 14.200 | 14.194 |
| Σfn/VLn | −0.613 | −1.176 | −0.631 | −1.338 | −0.908 | −0.712 |
| RL1 | 11.870 | 12.909 | 11.839 | 13.723 | 14.377 | 11.901 |
| RL2 | 3.326 | 3.571 | 3.588 | 3.723 | 5.211 | 4.717 |
| V1 | 63.880 | 67.002 | 63.880 | 58.610 | 77.360 | 61.560 |
| V3 | 23.352 | 23.352 | 23.352 | 25.920 | 25.920 | 23.350 |
| N1 | 1.620 | 1.594 | 1.620 | 1.666 | 1.515 | 1.631 |
| DL | 11.284 | 11.635 | 10.555 | 12.133 | 12.415 | 11.310 |
| DpL | 0.154 | 0.169 | 0.100 | 0.150 | 0.150 | 0.532 |
| Bf | 2.847 | 2.497 | 1.704 | 1.999 | 1.232 | 2.816 |

What is claimed is:

1. An imaging lens comprising:

seven to nine lenses inclusive having, in order from an object side, a first lens having negative refractive power, a second lens having negative refractive power, a third lens having positive refractive power, and a final lens that is arranged closest to an image surface side and has negative refractive power; and a diaphragm, wherein the imaging lens has resin lens sets that are independent in an object side from the diaphragm, and in an image side from the diaphragm, respectively, each of the resin lens sets includes a resin lens having positive refractive power and a resin lens having negative refractive power that are adjacent to each other, one resin lens included in each of the resin lens sets has a refractive index at line d that is smaller than 1.68 and an Abbe constant that is greater than 20 and less than 30, and following expressions are satisfied:

$$-0.50 < f \times \phi 2pf < 0.42 \quad (1)$$

$$0.0 < f \times \phi 2pb < 0.70 \quad (2)$$

here, f is a focal length of an optical system of the imaging lens,

ϕ2 pf is a reciprocal of a composite focal length of two of the resin lenses of a resin lens set in an object side from the diaphragm, and ϕ2pb is a reciprocal of a composite focal length of two of the resin lenses of a resin lens set in an image surface side from the diaphragm.

2. The imaging lens according to claim 1, wherein the third lens has a convex surface facing an image surface side, and a following expression is satisfied:

$$-2.3 < f2/f < 0.0 \quad (3)$$

here, f2 is a focal length of the second lens.

3. The imaging lens according to claim 1 satisfying a following expression:

$$-20.00 < fL/f < -1.61 \quad (4)$$

here, fL is a focal length of the final lens.

4. The imaging lens according to claim 1, wherein pieces of lenses are eight or less.

5. The imaging lens according to claim 1, wherein the final lens has a convex surface facing an image surface side.

6. The imaging lens according to claim 1, wherein the first lens has a concave surface facing an image surface side.

7. The imaging lens according to claim 1, wherein the second lens has a meniscus shape and has a concave surface facing an image surface side.

8. The imaging lens according to claim 1 satisfying a following expression:

$$0.0 < Dp/f < 1.3 \quad (5)$$

here,

Dp is a total thickness of resin lenses in an object side from the diaphragm.

9. The imaging lens according to claim 1 satisfying a following expression:

$$0.00 < Dp2/f < 1.00 \quad (6)$$

here,

Dp2 is a sum of center thicknesses of resin lenses in an object side from the diaphragm, other than a resin lens having negative refractive power included in the resin lens set.

10. The imaging lens according to claim 1 satisfying a following expression:

$$1.1 < ImgH/f < 2.5 \quad (7)$$

here,

ImgH is a maximum image height.

11. The imaging lens according to claim 1, wherein two resin lenses of the resin lens set are not cemented together.

12. The imaging lens according to claim 1 satisfying a following expression:

$$-9.0 < f1/f < -2.5 \quad (8)$$

here, f1 is a focal length of the first lens group.

13. An imaging device comprising: the imaging lens according to claim 1; and an image sensor, provided on an image surface side of the imaging lens, the image sensor converting an optical image formed by the imaging lens into an electrical signal.

* * * * *